United States Patent
Shinoda

(10) Patent No.: US 9,719,388 B2
(45) Date of Patent: Aug. 1, 2017

(54) EXHAUST COOLING SYSTEM FOR INTERNAL COMBUSTION ENGINE

(71) Applicant: Yoshihisa Shinoda, Susono (JP)

(72) Inventor: Yoshihisa Shinoda, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/891,194

(22) PCT Filed: May 16, 2013

(86) PCT No.: PCT/JP2013/063710
§ 371 (c)(1),
(2) Date: Nov. 13, 2015

(87) PCT Pub. No.: WO2014/184936
PCT Pub. Date: Nov. 20, 2014

(65) Prior Publication Data
US 2016/0090886 A1 Mar. 31, 2016

(51) Int. Cl.
*F01N 3/00* (2006.01)
*F01N 3/04* (2006.01)
(Continued)

(52) U.S. Cl.
CPC ............ *F01N 3/043* (2013.01); *F01N 3/28* (2013.01); *F01N 13/08* (2013.01); *F01N 13/14* (2013.01);
(Continued)

(58) Field of Classification Search
CPC . F01N 3/043; F01N 3/28; F01N 13/08; F01N 3/2046; F01N 3/05; F01N 3/2889;
(Continued)

(56) References Cited

U.S. PATENT DOCUMENTS

| 5,212,949 A | 5/1993 | Shiozawa |
| 2004/0127631 A1 | 7/2004 | Kanamori et al. |

FOREIGN PATENT DOCUMENTS

| DE | 10206066 A1 | 9/2002 |
| EP | 0928885 A2 | 7/1999 |

(Continued)

*Primary Examiner* — Mark Laurenzi
*Assistant Examiner* — Kelsey Stanek
(74) *Attorney, Agent, or Firm* — Andrews Kurth Kenyon LLP

(57) ABSTRACT

A cooling system for an internal combustion engine in which an exhaust purification catalyst is arranged in an exhaust passage of the internal combustion engine, the cooling system including: a cooling unit configured to cool the exhaust passage upstream of the exhaust purification catalyst; a heat transmission inhibition portion configured such that heat transfer from the exhaust passage downstream of a location cooled by the cooling unit to the cooling unit is inhibited; and a heat radiation suppression portion that is provided in a curved section positioned in the exhaust passage from a location where the heat transmission inhibition portion is provided to the exhaust purification catalyst, and that is configured to suppress heat radiation transmitted from exhaust gas flowing in the curved section to an atmosphere around the curved section through curved section passage walls forming the curved section. With such a configuration, the decrease in exhaust gas temperature can be suppressed.

5 Claims, 12 Drawing Sheets

(51) Int. Cl.
   *F01N 13/08*   (2010.01)
   *F01N 13/14*   (2010.01)
   *F01N 3/28*    (2006.01)

(52) U.S. Cl.
   CPC ...... *F01N 2340/00* (2013.01); *F01N 2510/02* (2013.01); *Y02T 10/20* (2013.01)

(58) Field of Classification Search
   CPC .... F01N 3/2885; F01N 13/14; F01N 2340/00; F01N 2510/02; F01N 2240/02; Y02T 10/20
   USPC ................................ 60/298, 299; 29/890.08
   See application file for complete search history.

(56) References Cited

FOREIGN PATENT DOCUMENTS

| | | | |
|---|---|---|---|
| JP | 07317539 A | * | 12/1995 |
| JP | H07-317539 A | | 12/1995 |
| JP | 09242537 A | * | 9/1997 |
| JP | H09-242537 A | | 9/1997 |
| JP | 2001-132872 A | | 5/2001 |
| JP | 2001132872 A | * | 5/2001 |
| JP | 2002-115601 A | | 4/2002 |
| JP | 2004-002604 A | | 1/2004 |
| JP | 2004-156547 A | | 6/2004 |
| JP | 2006-002604 A | | 1/2006 |
| JP | 2011-169311 A | | 9/2011 |
| JP | 2013-057272 A | | 3/2013 |
| JP | 2013057272 A | * | 3/2013 |

* cited by examiner (a)

(b)

EXHAUST COOLING SYSTEM FOR INTERNAL COMBUSTION ENGINE

CROSS-REFERENCE TO RELATED APPLICATION

This is a national phase application based on the PCT International Patent Application No. PCT/JP2013/063710 filed May 16, 2013, the entire contents of which are incorporated herein by reference.

TECHNICAL FIELD

The invention relates to an exhaust cooling system for an internal combustion engine.

BACKGROUND ART

Disposed in an exhaust passage of an external combustion engine are exhaust system components such as sensors for detecting data (for example, exhaust air/fuel ratio and exhaust gas temperature) relating primarily to the exhaust passage and also to an exhaust purification catalyst and exhaust gas, and those components are exposed to the exhaust gas flowing in the exhaust passage. The exhaust gas temperature changes according to the operation state of the internal combustion engine, and where the exhaust system components are exposed to the exhaust gas at a comparatively high temperature, the components can be damaged by the exhaust heat. A technique for preventing such damage caused by exhaust heat is disclosed, for example, in Patent Literature 1. With such a technique, a thermal insulation material is provided in the exhaust passage between an exhaust manifold and an exhaust purification catalyst at the inner circumferential surface of the passage where the exhaust temperature peaks, thereby protecting the exhaust passage. In this case, heat radiation from the exhaust passage outside the location where the thermal insulation material is disposed is maintained thereby still ensuring certain cooling of the exhaust gas and protecting the exhaust system components.

With another method for cooling exhaust gas, the amount of fuel contained in the exhaust gas is increased and the latent heat of vaporization thereof is used, but increasing the amount of fuel in exhaust gas is undesirable from the standpoint of emission since the concentration of carbon monoxide is easily increased. Mounting a cooling adapter of a water cooling system on an exhaust pipe is also a conventional technique as a technique for cooling the exhaust gas. Where such a cooling adapter is used, thermal load on exhaust system components can be effectively reduced, but since the exhaust gas is cooled even when the exhaust gas temperature is comparatively low, for example, in the cold start of the internal combustion engine, the exhaust purification catalyst is difficult to warm up rapidly. Accordingly, a technique has been disclosed by which a non-contact region is formed in a flange portion so as to reduce the contact surface area between the cooling adapter and the exhaust gas manifold (see, for example, Patent Literature 2).

Further, a cooling liquid flow channel for cooling an internal combustion engine has been formed in the cylinder head of the external combustion engine. A problem that can be associated with such a configuration is that the heat of exhaust gas is also taken away through the exhaust passage by the cooling liquid flowing in the flow channel, thereby decreasing the exhaust gas temperature. To resolve this problem, Patent Literature 3 discloses a technique relating to a mounting structure of a double-wall tubular exhaust manifold on a cylinder head side and suggests the structure of a mounting flange that inhibits the transfer of heat from the exhaust manifold side to the cylinder head.

Patent Literature 1: Japanese Patent Application Publication No. 2006-2604
Patent Literature 2: Japanese Patent Application Publication No. 2011-169311
Patent Literature 3: Japanese Patent Application Publication No. H9-242537
Patent Literature 4: Japanese Patent Application Publication No. 2002-115601
Patent Literature 5: Japanese Patent Application Publication No. 2004-156547

SUMMARY OF THE INVENTION

In an exhaust purification catalyst provided in the exhaust passage of an internal combustion engine, the catalyst temperature changes significantly depending on the temperature of exhaust gas flowing thereinto. In the internal combustion engine equipped with the above-described configuration for exhaust gas cooling (for example, the cooling adapter; referred to hereinbelow as "exhaust cooling configuration"), since the exhaust gas cooled by the exhaust cooling configuration flows to the exhaust purification catalyst, the catalyst temperature can be prevented from rising too high. Meanwhile, when the operation state of the internal combustion engine belongs to a low-load region and the exhaust gas temperature at the time of discharge from the internal combustion engine is comparatively low, the exhaust gas temperature is further decreased by the exhaust cooling configuration. Therefore, the temperature of the exhaust purification catalyst is difficult to maintain at a level suitable for exhaust purification and the emission can be degraded.

Where the suppression of decrease in exhaust gas temperature is investigated within the framework of the conventional techniques, it is insufficient to consider the cooling capacity itself of the exhaust cooling configuration provided on the cylinder head side of the internal combustion engine. The exhaust passage extends between the exhaust cooling configuration and exhaust purification catalyst, and before the exhaust gas discharged from the internal combustion engine reaches the exhaust purification catalyst, thermal energy is taken from the exhaust gas through the exhaust passage, and the cooling capacity of the exhaust cooling configuration greatly affects this heat transfer. In particular, the degree of heat radiation from the exhaust passage to the surrounding atmosphere is rather large and under strong influence of the cooling capacity of the exhaust cooling configuration. Therefore, from the standpoint of maintaining the advantageous temperature of the exhaust purification catalyst provided in the exhaust passage, the efforts to suppress the decrease in exhaust gas temperature which are based on the conventional techniques are insufficient.

The invention has been created with the above-described problems in view, and it is an objective of the invention to provide an exhaust cooling system for an internal combustion engine having the exhaust cooling configuration, the system making it possible to realize the advantageous suppression of decrease in exhaust gas temperature when the operation state of the internal combustion engine belongs to a low-load region and the exhaust gas temperature at the time of discharge from the internal combustion engine is comparatively low.

In the invention, in order to solve the above-described problems, the attention is focused on heat transfer to the cooling unit in which the heat of the exhaust gas flowing in the exhaust passage is transmitted through the exhaust passage and escapes from the exhaust passage to the cooling unit, and on heat radiation from the exhaust gas to the surrounding atmosphere which occurs through the passage wall of a curved section where the transmission of heat from the exhaust gas to the exhaust passage easily occurs and the temperature easily rises, in relation to the decrease in exhaust gas temperature occurring when the exhaust gas temperature at the time of discharge from the internal combustion engine is comparatively low. The inventors of the application have discovered that since those types of heat transfer are interrelated and greatly influence the decrease in exhaust gas temperature, the two types of heat transfer need to be adequately adjusted in order to suppress advantageously the decrease in exhaust gas temperature.

More specifically, the invention provides an exhaust cooling system for an internal combustion engine in which an exhaust purification catalyst is arranged in an exhaust passage of the internal combustion engine, the cooling system including: a cooling unit configured to cool the exhaust passage upstream of the exhaust purification catalyst; a heat transmission inhibition portion configured such that heat transfer from the exhaust passage downstream of a location cooled by the cooling unit to the cooling unit is inhibited; and a heat radiation suppression portion that is provided in a curved section positioned in the exhaust passage from a location where the heat transmission inhibition portion is provided to the exhaust purification catalyst, and that suppresses heat radiation transmitted from exhaust gas flowing in the curved section to an atmosphere around the curved section through curved section passage walls forming the curved section.

The cooling system for an internal combustion engine in accordance with the invention is configured such that the exhaust gas flowing in the exhaust passage is cooled by the cooling unit, and the cooled exhaust gas flows into the exhaust purification catalyst. In this case, the cooling capacity of the cooling unit causes cooling of the location where the cooling unit is arranged and also causes heat transfer between the cooling unit and the vicinity thereof, but the inventors of the application have focused attention on the fact that the cooling capacity is a factor causing heat transfer of other types in the exhaust passage. In the exhaust passage, the passage walls forming the exhaust passage (referred to hereinbelow as "exhaust passage walls") receive heat from the exhaust gas and increase in temperature, but thermal energy accumulated therein tends to be easily transferred to the cooling unit rather than to the exhaust purification catalyst positioned on the downstream side. This is because due to the cooling capacity of the cooling unit, the temperature gradient in the exhaust passage wall connected to the cooling unit increases, whereas in the exhaust passage wall connected to the exhaust purification catalyst, the temperature gradient becomes comparatively moderate. As a result, the cooling unit can become not only the configuration that cools the arrangement location thereof, but also the configuration that affects the heat transfer in the entire exhaust passage from the arrangement location thereof to the exhaust purification catalyst. Therefore, cooling of the exhaust gas in the exhaust passage is enhanced by the cooling unit, and the cooled exhaust gas flows into the exhaust purification catalyst. Further, in the case where the operation state of the internal combustion engine belongs to a low-load region and the exhaust gas temperature at the time of discharge from the internal combustion engine is comparatively low (referred to hereinbelow simply as "the case of low-load operation"), the effect of exhaust gas cooling with the cooling unit is particularly strong and the purification capacity of the exhaust purification catalyst can be decreased.

Accordingly, in the cooling system of the invention of the application, firstly, the decrease in exhaust gas temperature in the case of low-load operation is suppressed by providing the heat transmission inhibition portion. The heat transmission inhibition portion is configured to inhibit the heat transfer from the exhaust passage downstream of the location cooled by the cooling unit to the cooling unit, and various modes of such inhibition can be used, provided that the heat transfer from the downstream exhaust passage to the cooling unit is inhibited, that is, slowed, by comparison with the case in which the heat transmission inhibition portion is not present. For example, a thermal insulation member may be used as the heat transmission inhibition portion, and the thermal insulation member may be interposed between the cooling unit and the downstream exhaust passage. Further, the shape or material properties of a part of the exhaust passage connected to the cooling unit may be adjusted such as to hinder the heat transfer from the downstream side. By so configuring the heat transmission inhibition portion, it is possible to inhibit the transfer of heat flowing from the exhaust passage downstream of the cooling unit to the cooling unit. As a result, the decrease in temperature of the downstream exhaust passage is suppressed.

However, the inventors of the application have newly discovered that with such suppression of the decrease in temperature of the downstream exhaust passage alone, the suppression of the decrease in exhaust gas temperature is insufficient where heat transfer in the entire exhaust passage is considered. The results of the comprehensive research conducted by the inventors of the application on the basis of such new information have demonstrated that the inhibition of heat transfer with the heat transmission inhibition portion is strongly correlated with heat transfer in the downstream exhaust passage, that is, with heat radiation from the exhaust gas flowing therein. As a result of the inhibition of heat transfer with the heat transmission inhibition portion, thermal energy conducted from the exhaust gas is accumulated in the downstream exhaust passage walls and the temperature of the downstream exhaust passage walls easily rises. Where the temperature of the exhaust passage walls rises, a difference in temperature easily occurs between the exhaust passage walls and the surrounding atmosphere and heat radiation to the surrounding atmosphere is enhanced. As a result, it is difficult to suppress sufficiently the decrease in exhaust temperature.

Furthermore, the inventors of the application focused attention on a curved section in the downstream exhaust passage, that is, a region where the exhaust passage is curved with a predetermined curvature, as a location where heat is transferred from the exhaust gas to the downstream exhaust passage walls and the temperature thereof easily rises when the internal combustion engine is in a low-load operation mode. In such a curved section, the flow direction of the exhaust gas and the extension direction of the passage deviate from each other, thereby creating the component of the exhaust gas flow that is perpendicular to the passage wall (referred to hereinbelow as "perpendicular component of exhaust gas"). Therefore, heat transfer amount from the exhaust gas to the exhaust passage walls can be found to increase easily over that in the case of a small curvature of the exhaust passage or the case of a straight exhaust passage. In particular, since the heat transfer in the heat transmission inhibition portion is inhibited on the upstream side thereof, the accumulation of heat in the curved section is prone to become significant. As a consequence, the decrease in exhaust gas temperature caused by heat radiation therein cannot be ignored.

Therefore, in the cooling system for an internal combustion engine according to the invention of the application, the heat radiation suppression portion is provided with consideration for heat radiation in the curved section, as a factor causing the decrease in exhaust gas temperature, in relation to the cooling unit and heat transmission inhibition portion. With such a configuration, heat radiation from the exhaust gas flowing in the curved section to the surrounding atmosphere through the exhaust passage walls in the curved section is suppressed. As a result, heat transfer in the exhaust passage is advantageously adjusted with consideration for the factors mutually relevant to the decrease in exhaust gas temperature in the exhaust passage from the cooling unit to the exhaust purification catalyst, thereby making it possible to suppress advantageously the decrease in exhaust gas temperature.

In the above-described exhaust cooling system for an internal combustion engine, the cooling unit may be a cooling adapter that cools an upstream exhaust passage which is a part of the exhaust passage extending from a cylinder head of the internal combustion engine, and a downstream exhaust passage which is a part of the exhaust passage and has the curved section may be connected to the cooling adapter. In this case, the heat transmission inhibition portion may be formed at at least any of an end surface of the cooling adapter on a side to which the downstream exhaust passage is connected, a flange of the downstream exhaust passage on a side which is connected to the cooling adapter, a gasket arranged between the end surface of the cooling adapter and the flange, a fastening member for maintaining a connected state of the end surface of the cooling adapter and the flange, and a predetermined region from the flange to the curved section in the downstream exhaust passage.

Where the exhaust passage is thus cooled with the cooling adapter, the cooling unit is disposed outside the cylinder head. Therefore, in order to inhibit the conduction of heat from the exhaust gas to the exhaust passage and the transfer of heat that escapes therefrom to the cooling unit, it is preferred that the heat transmission inhibition portion be formed in the abovementioned five locations. Where the heat transmission inhibition portion is formed in the flange, gasket, and fastening members, the flange gasket and fastening members may be entirely configured such as to inhibit heat transfer. Further, the predetermined region where the heat transmission inhibition portion is formed may be the entire downstream exhaust passage between the curved section and flange, or part thereof, so as to inhibit advantageously the heat transfer from the curves section in which the temperature is likely to rise to the cooling unit.

As another configuration, in the above-described exhaust cooling system for an internal combustion engine, the cooling unit may be a cooling device that cools an exhaust gas passage in a head which is formed in the cylinder head of the internal combustion engine, and the exhaust passage having the curved section may be connected to the cylinder head. In such a configuration, the cooling unit is arranged inside the cylinder head. In this case, the heat transmission inhibition portion may be formed at at least any of a connection region of the cylinder head to which the exhaust passage is connected, a flange of the exhaust passage on a side which is connected to the cylinder head, a gasket arranged between the connection region and the flange, a fastening member for maintaining a connected state of the cylinder head and the flange, and a predetermined region from the flange to the curved section in the exhaust passage. With such a configuration, the effective inhibition of heat transfer from the exhaust passage to the cooling unit can be realized.

In the above-described cooling system for an internal combustion engine, the heat radiation suppression portion may be formed at at least either one of an inner wall surface of the curved section passage wall and an outer wall surface of the curved section passage wall. Where the heat radiation suppression portion is formed at the inner wall surface of the curved section passage wall, heat transfer from the exhaust gas flowing in the curved section to the curved section passage wall is inhibited. As a result, the increase in temperature of the curved section passage wall and heat radiation therefrom to the surrounding atmosphere are suppressed. Further, where the heat radiation suppression portion is formed at the outer wall surface of the curved section passage wall, heat transfer from the curved section passage wall to the surrounding atmosphere, that is, heat radiation, is suppressed.

Further, in the above-described cooling system for an internal combustion engine, the curved section may be defined to include an inner curved section with a relatively small curvature and an outer curved section with a relatively large curvature in a cross section including a central axis in a longitudinal direction of the exhaust passage; and the heat radiation suppression portion may be provided at at least the inner curved section of the curved section. In the curved section defined to include the inner curved section and the outer curved section, the perpendicular component of exhaust gas falls on the inner curved section when the internal combustion engine is in the low-load operation mode, and therefore the amount of heat transferred from the exhaust gas tends to be larger than that in the case of the outer curved section.

Therefore, heat radiation from the exhaust gas can be effectively suppressed in the exhaust cooling system in accordance with the invention by providing the heat radiation suppression portion at at least the inner curved section of the curved section. Thus, where the decrease in exhaust gas temperature can be sufficiently suppressed by providing the heat radiation suppression portion only at the inner curved section, for example, it is not always necessary to provide the heat radiation suppression portion at the outer curved section. As a result, the formation of the heat radiation suppression portion can be easily realized. Thus, it is not intended to restrict the formation of the heat radiation suppression portion to the outer curved section.

Further, in the above-described cooling system for an internal combustion engine, where the heat radiation suppression portion is provided at the inner curved section and the outer curved section, the heat radiation suppression portion may be formed such that a heat radiation suppression capacity of the heat radiation suppression portion in the inner curved section is higher than a heat radiation suppression capacity of the heat radiation suppression portion in the outer curved section. As mentioned hereinabove, since the inner curved section is more prone to temperature increase than the outer curved section, by making the heat radiation suppression capacity of the heat radiation suppression portion in the inner curved section relatively high, it is possible to suppress heat radiation from the exhaust gas more effectively. Further, the heat radiation suppression capacity of the heat radiation suppression portion means the degree of suppression of heat radiation from the exhaust gas, and where the specifically realized heat radiation suppression portion is, for example, the so-called thermal insulation member, the thermal insulation capacity thereof (the capacity to hinder the occurrence of heat transfer) corresponds to the heat radiation suppression capacity.

As another method for configuring the heat radiation suppression portion, in the above-described cooling system for an internal combustion engine, the heat radiation suppression portion may be formed by configuring a predetermined heat radiation suppression region, which includes the curved section in the exhaust passage, as a hollow multiwall tubular structure which is formed by arranging an inner tube and an outer tube apart from each other, and configuring the exhaust passage upstream of the predetermined heat radiation suppression region as a single-wall tubular structure or a multiwall tubular structure with the number of tubes less than that in the predetermined heat radiation suppression region. The multiwall tubular structure is inclusive of not only a double-wall tubular structure constituted by one inner tube and one outer tube, but also of a multiwall tubular structure constituted by three or more tubes. In the exhaust passage having such a multiwall tubular structure, the exhaust gas flows in the inner tube, but since a space is present between the inner tube and outer tube, the heat transferred from the exhaust gas to the inner tube is unlikely to be transferred to the outer tube. Therefore, by increasing the number of tubes in the multiwall tubular structure in the predetermined heat radiation suppression region including the curved section over that in the multiwall tubular structure of the upstream exhaust passage, it is possible to suppress effectively the heat radiation to the surrounding atmosphere in the predetermined heat radiation suppression region. Further, the feature of forming the heat radiation suppression portion in the predetermined heat radiation suppression region including the curved section serves to indicate that it is not the intention of the inventors of the application to restrict the zone for forming the heat radiation suppression portion only to the curved section. The predetermined heat radiation suppression region does not correspond to the entire exhaust passage including the curved section. Such considerations are also valid for the below-described technical ideas.

As yet another method for configuring the heat radiation suppression portion, in the above-described cooling system for an internal combustion engine, the heat radiation suppression portion may be formed by configuring the exhaust passage as a hollow multiwall tubular structure formed by arranging an inner tube and an outer tube apart from each other, and making a thickness of a hollow layer of a multiwall tube in a predetermined heat radiation suppression region including the curved section larger than a thickness of a hollow layer of a multiwall tube upstream of the predetermined heat radiation suppression region. With such a configuration, heat radiation to the surrounding atmosphere in the predetermined heat radiation suppression region can be also effectively suppressed.

As still another method for configuring the heat radiation suppression portion, in the above-described cooling system for an internal combustion engine, the heat radiation suppression portion may be formed by making a thickness of a passage wall of a predetermined heat radiation suppression region including the curved section in the exhaust passage larger than a thickness of a passage wall of the exhaust passage upstream of the predetermined heat radiation suppression region. Where the thickness of the passage wall of the predetermined heat radiation suppression region is thus increased, thermal capacity of the predetermined heat radiation suppression region is increased. Therefore, the increase in temperature of this region can be moderated and the difference in temperature with the surrounding atmosphere can be suppressed. As a result, heat radiation to the surrounding atmosphere in the predetermined heat radiation suppression region can be effectively suppressed.

The above-described cooling system for an internal combustion engine may be configured such that a heat radiation suppression capacity exhibited by the heat radiation suppression portion increases as a heat transfer inhibition capacity exhibited by the heat transmission inhibition portion or a curve angle of the curved section becomes larger. The heat transfer inhibition capacity exhibited by the heat transmission inhibition portion means a degree to which heat transfer from the downstream exhaust passage to the cooling unit can be inhibited due to the presence of the heat transmission inhibition portion and where the specifically realized heat transmission inhibition portion is, for example, the so-called thermal insulation member, the thermal insulation capacity thereof (the capacity to hinder the occurrence of heat transfer) corresponds to the inhibition capacity. The curved section temperature rises easier where the heat transfer inhibition capacity exhibited by the heat transmission inhibition portion is high, and the straight forward component of the exhaust gas falling on the exhaust passage wall is larger for a large curve angle of the curved section. Therefore, the increase in curved section temperature is facilitated. Accordingly, by using the abovementioned configuration, heat radiation from the exhaust gas in the curved section can be effectively suppressed.

In the above-described cooling system for an internal combustion engine, the heat radiation suppression portion in the curved section may be formed by coating a liquid thermal insulation material. Where a coatable thermal insulation material is thus used, the formation of the heat radiation suppression portion is facilitated.

Another aspect of the cooling system for an internal combustion engine according to the invention of the application is described hereinbelow. Thus, the invention of the application provides a cooling system for an internal combustion engine in which an exhaust purification catalyst is arranged in an exhaust passage of the internal combustion engine, the cooling system including: a cooling unit configured to cool the exhaust passage upstream of the exhaust purification catalyst; and a heat radiation suppression portion that is provided at at least an inner curved section of a curved section which is defined to include the inner curved section with a relatively small curvature and an outer curved section with a relatively large curvature in a cross section including a central axis in a longitudinal direction of the exhaust passage, and which is positioned in the exhaust passage from a location cooled by the cooling unit to the exhaust purification catalyst, the heat radiation suppression portion being also configured to suppress heat radiation transmitted from exhaust gas flowing in the curved section to an atmosphere around the curved section through curved section passage walls forming the curved section.

As mentioned hereinabove, the curved section in the downstream exhaust passage is the location where heat is transferred from the exhaust gas to the downstream exhaust passage walls and the temperature thereof easily rises when the internal combustion engine is in a low-load operation mode, and the temperature rises particularly easily at the inner curved section. Therefore, heat accumulation in at least the inner curved section is prone to be significant. For this reason, the decrease in heat exhaust temperature caused by heat radiation therein cannot be ignored. Accordingly, in the invention of the application, by providing the heat radiation suppression portion at at least the inner curved section of the curved section, as described hereinabove, it is possible to suppress heat radiation from the exhaust gas flowing in the curved section to the surrounding atmosphere through the exhaust passage walls of the curved section.

The technical ideas according to the invention of the application which have already been described can be applied to the abovementioned cooling system for an internal combustion engine, provided that no technical conflict is caused thereby. Thus, in the cooling system for an internal combustion engine, the heat radiation suppression portion may be formed at at least either one of an inner wall surface of the curved section passage wall and an outer wall surface of the curved section passage wall. Further, in the cooling system for an internal combustion engine, the heat radiation suppression portion may be provided at the inner curved section and the outer curved section and formed such that a heat radiation suppression capacity of the heat radiation suppression portion in the inner curved section is higher than a heat radiation suppression capacity of the heat radiation suppression portion in the outer curved section. Further, the cooling system for an internal combustion engine may be configured such that heat radiation suppression capacity exhibited by the heat radiation suppression portion increases as a curve angle of the curved section becomes larger.

As another configuration of the above-described heat radiation inhibition portion, in the cooling system for an internal combustion engine, the heat radiation suppression portion may be formed by configuring a predetermined heat radiation suppression region, which includes the curved section in the exhaust passage, as a hollow multiwall tubular structure which is formed by arranging an inner tube and an outer tube apart from each other, and configuring the exhaust passage upstream of the predetermined heat radiation suppression region as a single-wall tubular structure or a multiwall tubular structure with the number of tubes less than that in the predetermined heat radiation suppression region. Alternatively, the heat radiation suppression portion may be formed by configuring the exhaust passage as a hollow multiwall tubular structure formed by arranging an inner tube and an outer tube apart from each other, and making a thickness of a hollow layer of a multiwall tube in a predetermined heat radiation suppression region including the curved section larger than a thickness of a hollow layer of a multiwall tube upstream of the predetermined heat radiation suppression region. In another possible configuration, the heat radiation suppression portion may be formed by making a thickness of a passage wall of a predetermined heat radiation suppression region including the curved section in the exhaust passage larger than a thickness of a passage wall of the exhaust passage upstream of the predetermined heat radiation suppression region.

In an exhaust cooling system for an internal combustion engine having the exhaust cooling configuration, advantageous suppression of the decrease in exhaust gas temperature can be realized when the operation state of the internal combustion engine belongs to a low-load region and the exhaust gas temperature at the time of discharge from the internal combustion engine is comparatively low.

MODES FOR CARRYING OUT THE INVENTION

Specific embodiments of the invention will be explained hereinbelow with reference to the appended figures. The dimensions, materials, shapes, and mutual arrangement of the constituent components described in the embodiments are not intended to limit the technical scope of the invention unless specifically indicated otherwise.

Exemplary Embodiment 1

Figure 1:
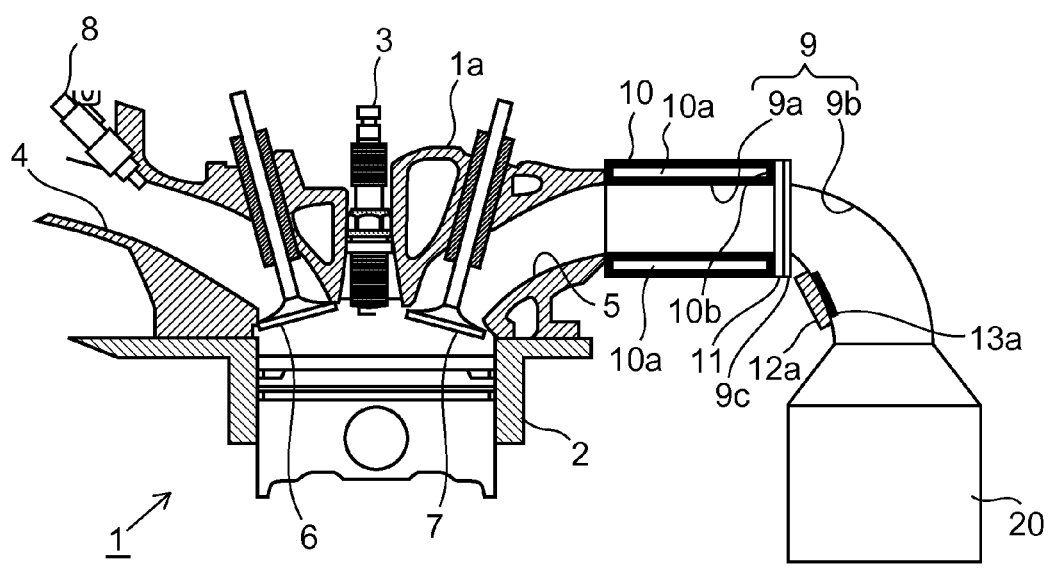
FIG. 1 is a first drawing illustrating the schematic configuration of the exhaust cooling system for an internal combustion engine according to the invention.

An exemplary embodiment of the exhaust cooling system for an internal combustion engine in accordance with the invention will be explained with reference to the drawings appended to the description of the application. FIG. 1 depicts a schematic configuration of the exhaust cooling system for an internal combustion engine according to the exemplary embodiment and a schematic configuration of the internal combustion engine equipped with the system. An internal combustion engine 1 is an engine (gasoline engine) that has a spark ignition system and has a plurality of cylinders. FIG. 1 depicts only one cylinder from among the plurality of cylinders of the internal combustion engine 1. A sparkplug 3 is mounted on each cylinder 2 of the internal combustion engine 1. The internal combustion engine 1 is provided with an intake port 4 and an exhaust port 5. The intake port 4 is a passage for introducing air and fuel into the cylinder 2 of the internal combustion engine 1. The intake port is opened and closed by an intake valve 6. The exhaust port 5 is a passage for discharging gas (burned gas) which has been burned inside the cylinder 2 from inside the cylinder 2. The exhaust port is opened and closed by an exhaust valve 7.

The intake port 4 is connected to an intake passage (not depicted in the figure) and takes in new gas (air) from the atmosphere. A fuel injection valve 8 is mounted in the intake port 4 so as to inject fuel therein. The exhaust port 5 is connected to an exhaust passage 9. The exhaust passage 9 guides the exhaust gas, which is discharged from the inside of the cylinder 2 into the exhaust port 5, to a tail pipe (not depicted in the figure). For example, an exhaust manifold or an exhaust pipe located downstream thereof in the internal combustion engine 1 corresponds to the exhaust passage 9. An exhaust purification catalyst 20 for exhaust purification is provided in the exhaust passage 9. Examples of the exhaust purification catalyst 20 include an oxidation catalyst, three-way catalyst, occlusion reduction NOx catalyst, and selective reduction NOx catalyst.

The internal combustion engine 1 depicted in FIG. 1 is provided with a cooling adapter 10 for cooling the exhaust gas flowing in the exhaust passage 9. More specifically, the cooling adapter 10 has a cooling water channel 10a inside of which cooling water circulates, and the cooling surface of the cooling adapter 10 is arranged such as to cover the outer circumference of the exhaust passage 9a immediately downstream of the exhaust port 5. The cooling water channel 10a of the cooling adapter 10 may be configured to be connected to the cooling water channel (not depicted in the figure) of the internal combustion engine 1 such that the cooling water is circulated by a common circulation pump, or it may be configured such that the cooling water is circulated independently of the cooling water channel of the internal combustion engine 1. The exhaust passage 9a which is a location directly cooled by the cooling adapter 10 is sometimes referred to hereinbelow as "upstream exhaust passage".

Further, a downstream exhaust passage 9b defining the exhaust passage to the exhaust purification catalyst 20 is provided downstream of the upstream exhaust passage 9a. A connection flange 9c is provided in the downstream exhaust passage 9b on the upstream exhaust passage 9a side thereof, and the downstream exhaust passage 9b and the upstream exhaust passage 9a are connected in a state in which a thermal insulation gasket 11 is interposed between the connection flange 9c and the upstream exhaust passage 9a. In this configuration, the downstream exhaust passage 9b is formed to include a curved section such that the flow direction of the exhaust gas changes as depicted in FIG. 1, and the exhaust gas that has passed through the curved section flows into the exhaust purification catalyst 20. Thermal insulation coat portions 12a, 13a formed by coating a thermal insulation material are provided in the curved section. The thermal insulation gasket 11 corresponds to the heat transmission inhibition portion according to the invention, and the thermal insulation coat portions 12a, 13a correspond to the heat radiation suppression portion according to the invention; detailed description thereof is presented hereinbelow.

In the internal combustion engine 1 provided with the cooling adapter 10 that cools the exhaust gas flowing in the upstream exhaust passage 9a, a thermal load applied to components disposed in the exhaust system can be reduced and service life of the components can be extended by reducing the temperature of the exhaust gas discharged from the internal combustion engine 1. In particular, the amount of noble metal which is to be contained in the exhaust purification catalyst can be reduced by suppressing the increase in temperature of the exhaust gas flowing into the exhaust purification catalyst 20. As an alternative technique, it is also possible to increase the amount of fuel contained in the exhaust gas and reduce the exhaust gas temperature by latent heat of vaporization of the fuel, but in such a case, fuel efficiency is easily degraded or emission degradation (for example, increase in carbon monoxide concentration) associated with the increase in the amount of fuel easily occurs. Therefore, cooling the exhaust gas with the cooling adapter 10 is also effective in terms of increasing the exhaust gas purification characteristic of the internal combustion engine 1.

Meanwhile, where the exhaust gas is cooled with the cooling adapter 10 when the temperature of the exhaust gas discharged from the internal combustion engine 1 is comparatively low, that is, when the internal combustion engine 1 is in a low-load operation mode (for example, when the exhaust gas enthalpy is less than 10 kW to 20 kW), the temperature of the exhaust gas flowing into the exhaust purification catalyst 20 becomes excessively low. As a result, the efficiency of exhaust gas purification with the exhaust purification catalyst 20 can be greatly decreased. Accordingly, in the invention of the application, the exhaust cooling system for suppressing the decrease in exhaust temperature in the low-load operation mode of the internal combustion engine 1 is constructed with consideration for heat transfer in the entire exhaust passage including the downstream exhaust passage 9b which is connected to the upstream exhaust passage 9a directly cooled by the cooling adapter 10 and in which flows the exhaust gas flowing into the exhaust purification catalyst 20.

Figure 2:
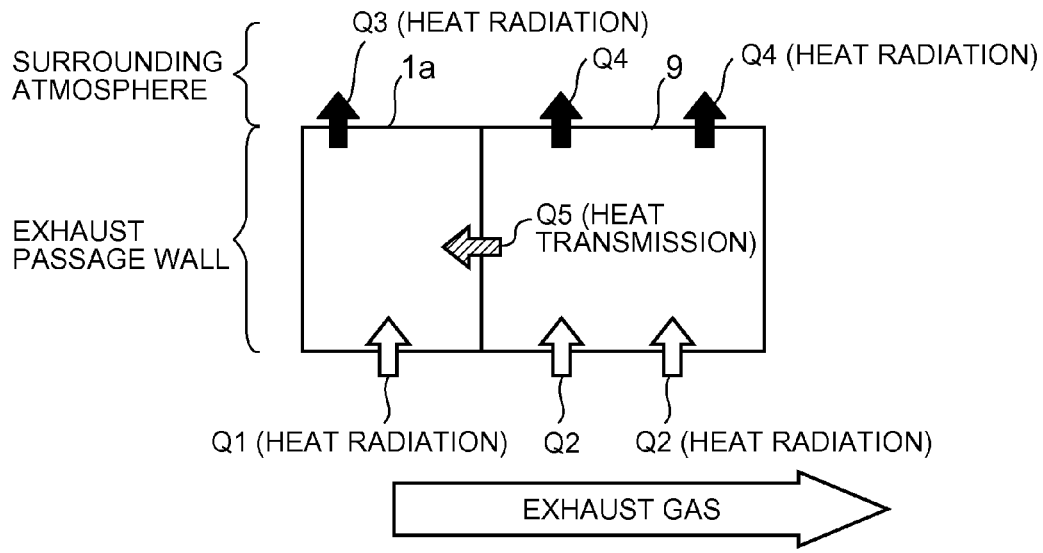
FIG. 2 illustrates schematically the heat transfer in the exhaust system of an internal combustion engine.
Figure 2:
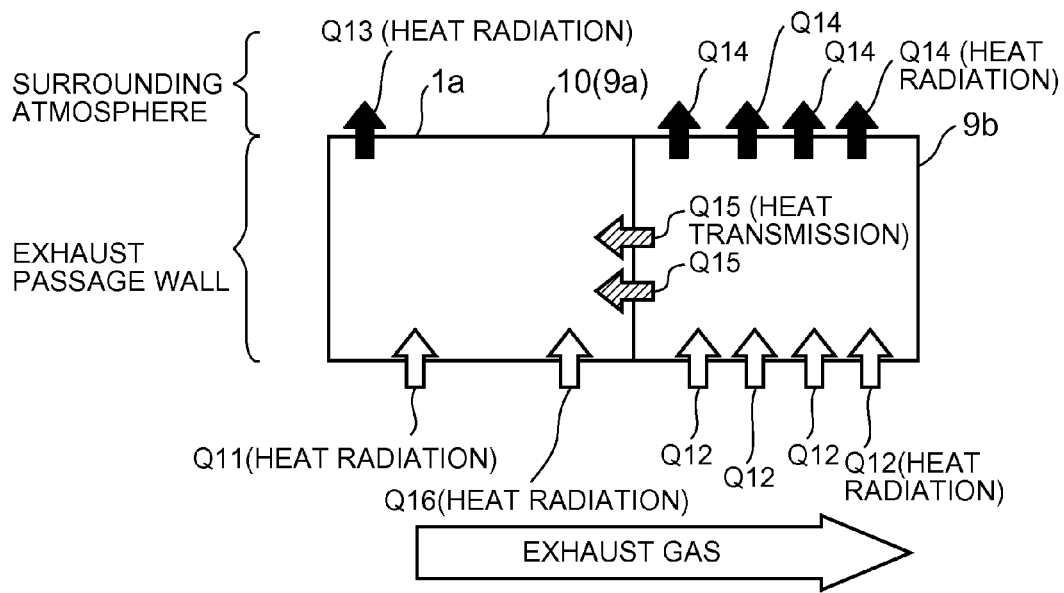

The upper section (a) of FIG. 2 illustrates schematically the heat transfer between the exhaust passage wall on a cylinder head 1a side having the exhaust port 5 and the exhaust passage wall on the exhaust passage 9 side in the configuration in which the cooling adapter 10 is not provided. In this case, in the cylinder head 1a, the heat generated by combustion inside the cylinder 2 is transferred as heat radiation Q1, and the heat of the cylinder head 1a is transferred as heat radiation Q3 to the atmosphere (surrounding atmosphere). Further, in the exhaust passage 9, the heat of the exhaust gas flowing in the exhaust passage 9 is transferred as heat radiation Q2 from the exhaust gas to the exhaust passage 9, and the heat of the exhaust passage 9 is transferred as heat radiation Q4 to the atmosphere. When the internal combustion engine 1 is in the low-load operation mode, the increase in the engine temperature of the internal combustion engine 1 is insufficient, but since the exhaust passage 9 is exposed to the post-combustion exhaust gas, the temperature of the exhaust passage 9 tends to be higher than the temperature of the cylinder head 1a. Therefore, the heat is transferred as heat transmission Q5 from the exhaust passage 9 to the cylinder head 1a.

The heat transfer in the configuration including the cooling adapter 10 will be explained hereinbelow with reference to the lower section (b) of FIG. 2. In FIG. 2 which is a schematic configuration, the upstream exhaust passage 9a which is directly cooled by the cooling adapter 10 can be considered to be integral with the cooling adapter 10. Therefore, in FIG. 2(b) which illustrates the heat transfer, the exhaust passage wall on the downstream exhaust passage 9b side is disposed adjacently to the exhaust passage wall on the cooling adapter 10 side. The heat transfer in the cylinder head 1a is the same as that explained with reference to FIG. 2(a), heat radiation Q11 depicted in FIG. 2(b) corresponds to the heat radiation Q1 in FIG. 2(a), and heat radiation Q13 in FIG. 2(b) corresponds to the heat radiation Q3 in FIG. 2(a). Here, in the cooling adapter 10, heat is also transferred as heat radiation Q16 from the exhaust gas flowing in the upstream exhaust passage 9a. This heat transfer becomes the direct exhaust gas cooling performed by the cooling adapter 10.

Likewise, in the downstream exhaust passage 9b, heat of the exhaust gas flowing in the downstream exhaust passage 9b is transferred as heat radiation Q12 from the exhaust gas to the downstream exhaust passage 9b, and heat of the downstream exhaust passage 9b is transferred as heat radiation Q14 to the atmosphere. Where the cooling adapter 10 is present, heat is transferred as heat transmission Q15 from the downstream exhaust passage 9b to the cooling adapter 10 due to the cooling capacity thereof. Since the cooling adapter 10 is of a water cooling system, the cooling capacity thereof is comparatively large. Therefore, the temperature gradient in the exhaust passage wall from the cooling adapter 10 to the downstream exhaust passage 9b increases. As a result, the quantity of heat transmission Q15 becomes much larger than the quantity of heat transmission Q5 depicted in FIG. 2(a). As a consequence, heat radiation in the downstream exhaust passage 9b is enhanced and the quantity of heat radiation Q12 and Q14 becomes larger than that of the heat radiation Q2 and Q4 depicted in FIG. 2(a). It follows from the above, that where the cooling adapter 10 is present, heat radiation from the exhaust gas flowing in the downstream exhaust passage 9b is enhanced, the exhaust gas with a reduced temperature easily flows to the exhaust purification catalyst 20, and the exhaust temperature reduction effect can be prominently demonstrated when the internal combustion engine 1 is in the low-load operation mode.

Thus, by providing the cooling adapter 10, it is possible to extend the service life of exhaust system components and improve the exhaust purification characteristic of the internal combustion engine 1, but the exhaust gas temperature in the low-load operation mode of the internal combustion engine 1 can be decreased. Accordingly, in the invention of the application, the decrease in the exhaust gas temperature is effectively suppressed by considering comprehensively the heat transfer induced by the cooling adapter 10, which is depicted in FIG. 2(b), that is, by considering the relationship between the heat transmission Q15 and heat radiation Q12 and Q14 (this relationship between heat transfer amounts will be referred to hereinbelow as "heat transfer correlation"). More specifically, as depicted in FIG. 1, the thermal insulation gasket 11 which functions as a gasket and is formed from a material (for example, a ceramic) that has thermal insulation capacity superior to that of SUS, which is the material of the upstream exhaust passage 9a and the downstream exhaust passage 9b, that is, from a material with a low overall heat transmittance, is provided between the connection flange 9c of the downstream exhaust passage 8b and the upstream exhaust passage 9a in order to inhibit the heat transmission Q15.

Figure 3:
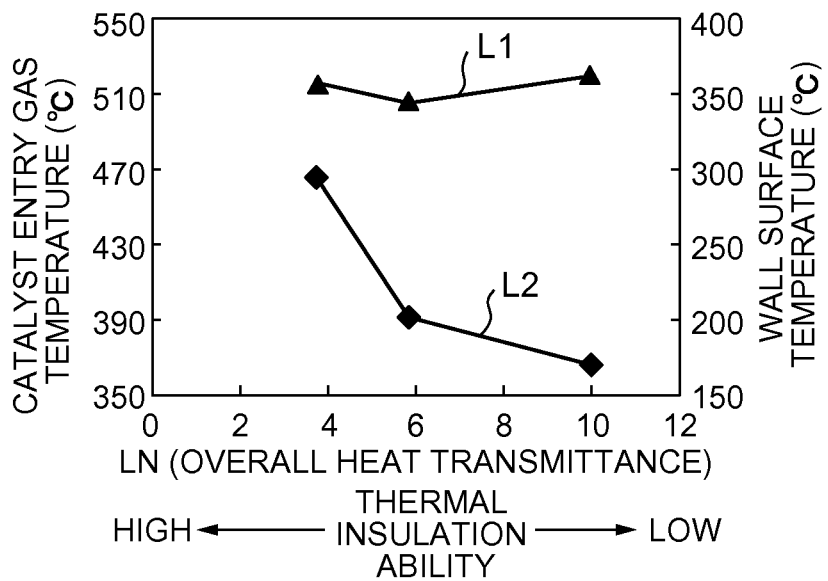
FIG. 3 illustrates the correlation between thermal insulation ability of a thermal insulation gasket provided in an exhaust passage and the temperature of exhaust gas flowing to a catalyst as well as the wall surface temperature of the exhaust passage.
Figure 4:
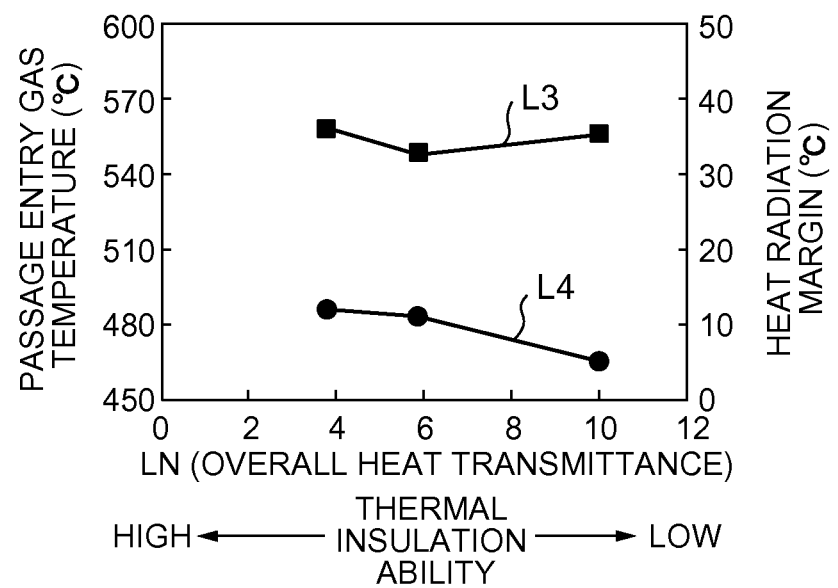
FIG. 4 illustrates the correlation between thermal insulation ability of a thermal insulation gasket provided in an exhaust passage and exhaust gas temperature and also heat radiation margin in the exhaust passage.

The effect produced by the thermal insulation gasket 11 on the heat transfer correlation will be explained hereinbelow in detail with reference to FIGS. 3 and 4. FIG. 3 depicts the correlation between the overall heat transmittance of the thermal insulation gasket 11 and the temperature of the exhaust gas flowing into the exhaust purification catalyst 20 (catalyst entry gas temperature) (correlation indicated by line L1) and the correlation between the overall heat transmittance of the thermal insulation gasket 11 and the wall surface temperature of the downstream exhaust passage 9b (correlation indicated by line L2) for the case where the thermal insulation gasket 11 is disposed between the upstream exhaust passage 9a and the downstream exhaust passage 9b in the internal combustion engine 1 depicted in FIG. 1. Further, FIG. 4 depicts the correlation between the overall heat transmittance of the thermal insulation gasket 11 and the entry gas temperature of the downstream exhaust passage 9b (passage entry gas temperature) (correlation indicated by line L3) and the correlation between the overall heat transmittance of the thermal insulation gasket 11 and the heat radiation margin of the downstream exhaust passage 9b (correlation indicated by line L4) also for the case where the thermal insulation gasket 11 is disposed between the upstream exhaust passage 9a and the downstream exhaust passage 9b in the internal combustion engine 1 depicted in FIG. 1. The overall heat transmittance is calculated according to the following Expression (1) from thermal resistance values (R1, ... , Rn) of each material (one material or a plurality of materials) constituting the thermal insulation gasket 11, each thermal resistance value being obtained by dividing thermal conductivity of the material by the thickness thereof. It means that the lower is the value of the overall heat transmittance, the higher is the thermal insulation ability.

$$\text{Overall heat transmittance} = 1/\Sigma(R1 + \ldots + Rn) \quad \text{(Expression 1)}$$

Where the thermal insulation ability of the thermal insulation gasket 11 increases, the wall surface temperature of the downstream exhaust passage 9b rises, as indicated by the line L2. It means that since heat transfer (heat transmission Q15) from the wall of the downstream exhaust passage 9b to the wall of the upstream exhaust passage 9a is inhibited by the thermal insulation gasket 11, a large amount of heat is retained in the wall of the downstream exhaust passage 9b. As a result, as indicated by the line L3, the entry gas temperature of the downstream exhaust passage 9b also rises fallowing the increase in thermal insulation ability of the thermal insulation gasket 11. However, the catalyst entry gas temperature does not show significant changes regardless of the thermal insulation ability of the thermal insulation gasket 11, as indicated by the line L1. This is apparently because the heat radiation margin of the downstream exhaust passage 9b rises, that is, the heat radiation Q12 and Q14 in the downstream exhaust passage 9b increases, following the increase in the thermal insulation ability of the thermal insulation gasket 11, as indicated by the line L4. Thus, there is a correlation between the heat transmission Q15 and heat radiation Q12 and Q14, and this correlation is the above-mentioned heat transfer correlation. By increasing the thermal insulation ability of the thermal insulation gasket 11 on the basis of this heat transfer correlation alone, it is difficult to suppress sufficiently the decrease in temperature of the exhaust gas flowing to the exhaust purification catalyst 20.

Accordingly, the invention uses the feature of inhibiting the heat transmission Q15 with the thermal insulation gasket 11 and suppressing the heat radiation Q12 and Q14 with the downstream exhaust passage 9b. In particular, the inventors of the application have discovered that when the downstream exhaust passage 9b is curved from the location where the downstream exhaust passage is connected to the upstream exhaust passage 9a to the exhaust purification catalyst 20, the temperature of the passage wall rises in the curved section and heat radiation from the exhaust gas becomes significant through the passage wall which has increased in temperature, that is, heat radiation Q12 and Q14 in the curved section increases. Heat radiation in the curved section of the downstream exhaust passage 9b will be explained hereinbelow with reference to FIGS. 5A to 5E and FIGS. 6A and 6B. The curved section, as referred to in the invention, is the entire exhaust passage, or part thereof, which is defined to include an inner curved section of a relatively small curvature and an outer curved section of a relatively larger curvature in a cross section including a central axis in the longitudinal direction (exhaust gas flow direction) of the exhaust passage. The deviation between the extension direction of the passage at the inlet and outlet of the curved section is defined as a curve angle of the curved section.

FIGS. 5A to 5E depict the downstream exhaust passages 9b that have curved sections 9d having a curve angle of 30 degrees, 45 degrees, 60 degrees, 75 degrees, and 90 degrees, respectively, and the same cross-sectional area with respect to the exhaust gas flow. The figures also depict the exhaust gas flow velocity patterns with respect to the case in which exhaust gas of a predetermined enthalpy flows in the low-load operation mode of the internal combustion engine 1 in the downstream exhaust passages 9b in each figure. More specifically, in the curved section 9d in each figure, the left side in the figure is the inner curved section of a small curvature and the right side in the figure is an outer curved section of a large curvature. In the curved section 9d, the exhaust gas flow velocity is displayed using variable density, with the display density increasing as the exhaust gas flow velocity rises.

As can be understood from FIGS. 5A to 5E, a region in which the exhaust gas flow velocity is relatively high is formed adjacently to the inner curved section, and this region increases in size as the curve angle increases. As a result, a region R1 with a relatively low exhaust gas flow velocity and a region R2 with a relatively high exhaust gas flow velocity are formed in the exhaust passage downstream of the curved section 9d, that is, in the straight-flow exhaust passage. Further, the region R1 with a relatively low exhaust gas flow velocity enlarges as the curve angle of the curved section 9d increases, and where the curve angle exceeds 75 degrees, the exhaust gas flow peels off, and a back flow occurs in the region R1 shown by hatching in FIGS. 5D and 5E.

Figure 5A:
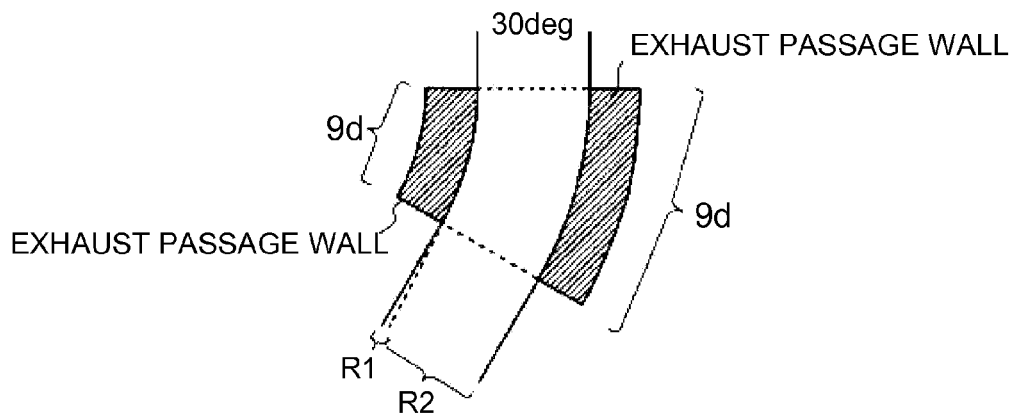
FIG. 5A illustrates the flow of exhaust gas in an exhaust passage when the curve angle of the exhaust passage is 30 degrees.
Figure 5B:
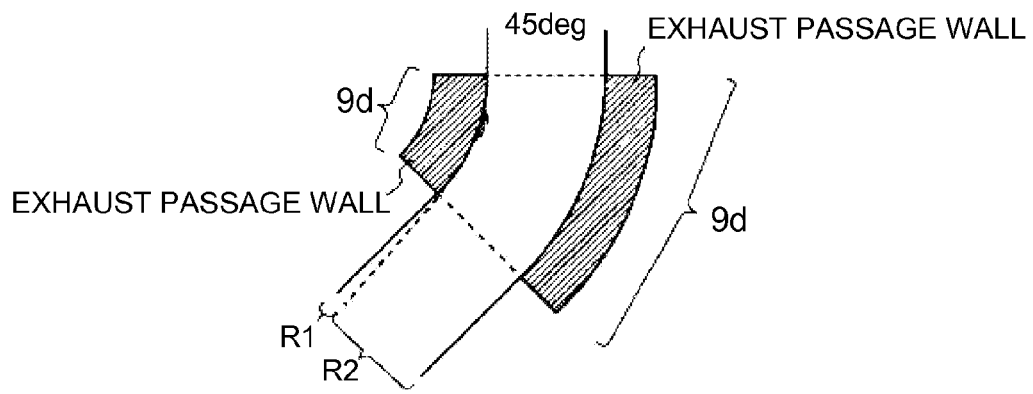
FIG. 5B illustrates the flow of exhaust gas in an exhaust passage when the curve angle of the exhaust passage is 45 degrees.
Figure 5C:
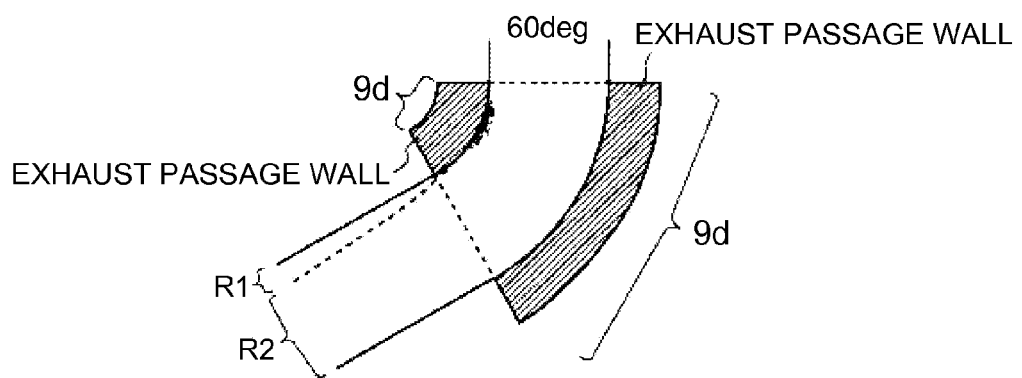
FIG. 5C illustrates the flow of exhaust gas in an exhaust passage when the curve angle of the exhaust passage is 60 degrees.
Figure 5D:
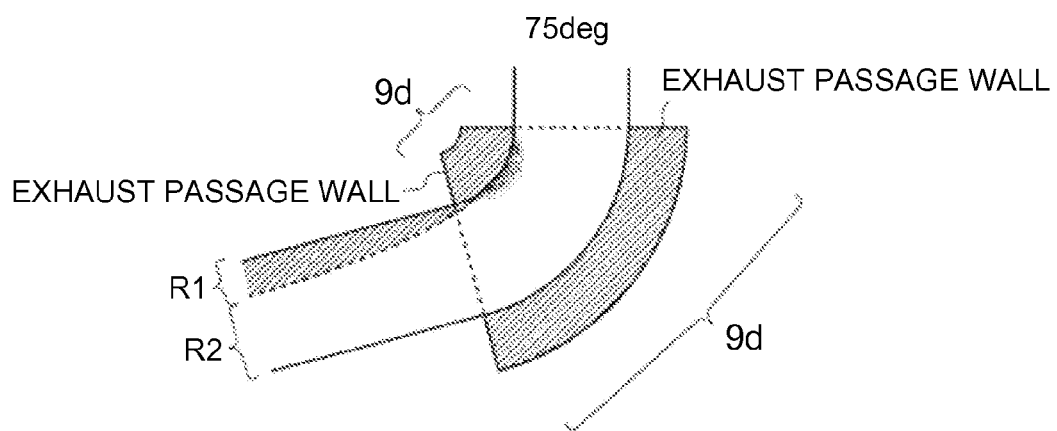
FIG. 5D illustrates the flow of exhaust gas in an exhaust passage when the curve angle of the exhaust passage is 75 degrees.
Figure 5E:
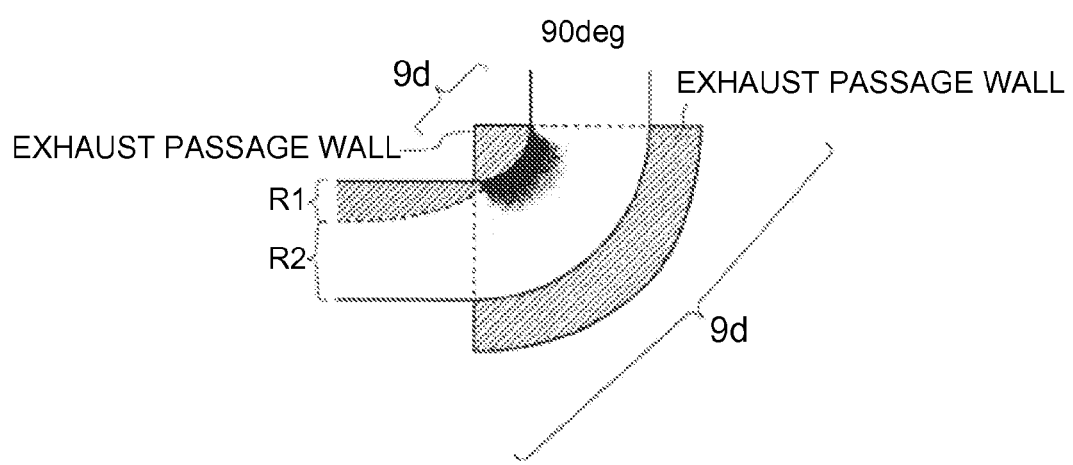
FIG. 5E illustrates the flow of exhaust gas in an exhaust passage when the curve angle of the exhaust passage is 90 degrees.
Figure 6A:
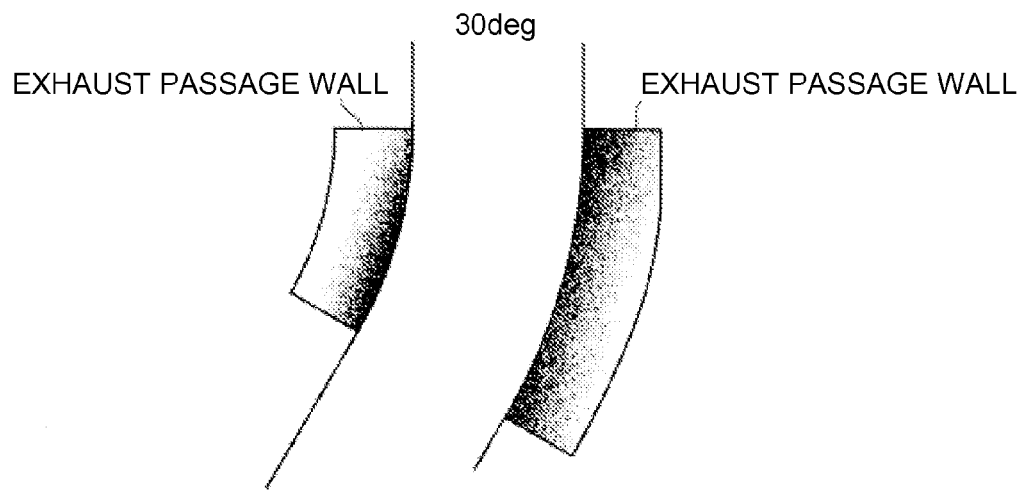
FIG. 6A illustrates the distribution of temperature in an exhaust passage wall when the curve angle of the exhaust passage is 30 degrees.
Figure 6B:
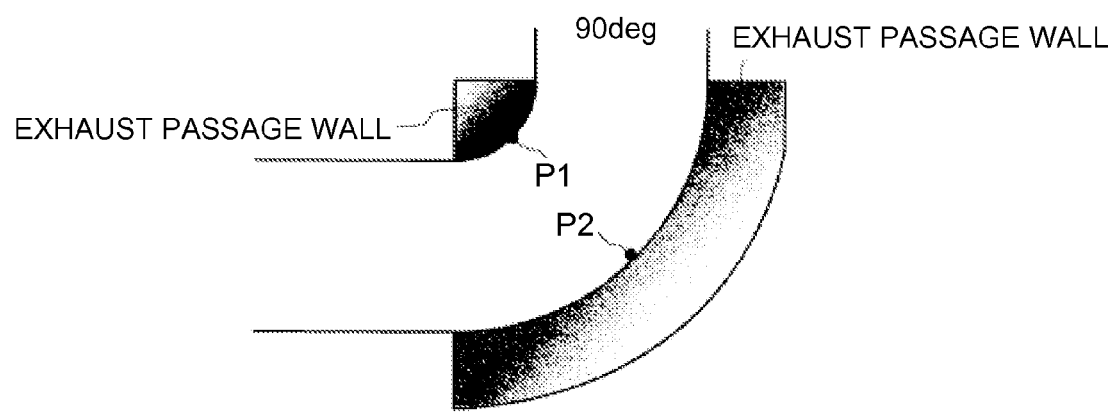
FIG. 6B illustrates the distribution of temperature in an exhaust passage wall when the curve angle of the exhaust passage is 90 degrees.
Figure 7:
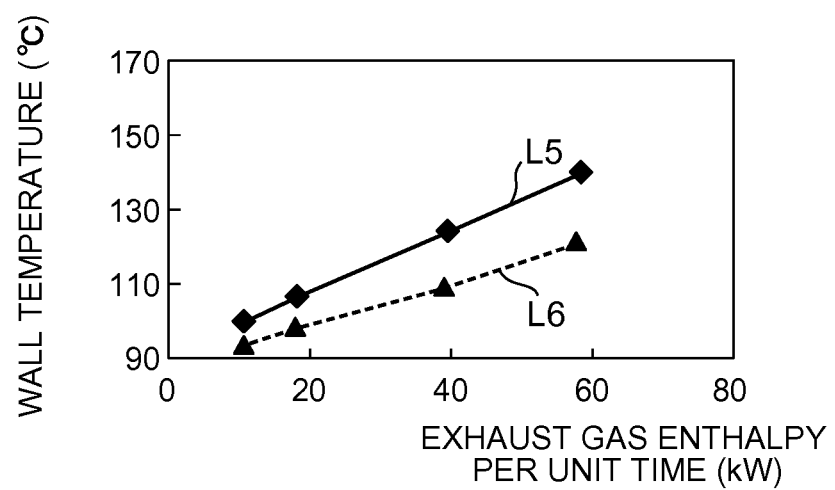
FIG. 7 illustrates the correlation between the enthalpy of exhaust gas flowing in an exhaust passage and the temperature of the exhaust passage wall when the curve angle of the exhaust passage is 90 degrees.

As the curve angle of the curved section 9d increases, the perpendicular component of the exhaust gas falling on the inner wall surface of the inner curved section increases, and also a high-velocity exhaust gas flow is formed close to the inner wall surface of the inner curved section, as depicted in FIGS. 5A to 5E. Therefore, the temperature of the inner curved section easily rises. Further, it can be also found that where the curve angle increases and the exhaust gas flow peels off, as mentioned hereinabove, the exhaust gas flow in the outlet of the inner curved section is disturbed which also becomes a factor causing the increase in temperature of the inner curved section on the upstream side thereof. FIGS. 6A and 6B depict a heat distribution in the exhaust passage wall of the curved section 9d with the curve angle of 30 degrees which is depicted in FIG. 5A and a heat distribution in the exhaust passage wall of the curved section 9d with the curve angle of 90 degrees which is depicted in FIG. 5E, respectively. In the heat distributions in both figures, the density increases with the temperature. As can be understood from FIGS. 6A and 6B, when the curve angle of the curved section 9d is small, the difference in temperature of the passage wall surface between the inner curved section and outer curved section is not so large, but where the curve angle of the curved section 9d increases, the temperature of the passage wall surface of the inner curved section tends to increase over the temperature of the passage wall surface of the outer curved section. FIG. 7 shows the correlation between the enthalpy of the exhaust gas flowing through the curved section 9d and the passage wall surface temperature at the central point P1 of the inner curved section (correlation indicated by a line L5) and the correlation between the enthalpy of the exhaust gas and the passage wall surface temperature at the central point P2 of the outer curved section (correlation indicated by a line L6). As can be understood from FIG. 7, it can be found that the temperature of the passage wall surface of the inner curved section tends to be relatively high even when the internal combustion engine 1 is in a low-load operation mode (that is, when the exhaust gas enthalpy is lower than 10 kW to 20 kW). The central points on the curved section 9d (central points P1 and P2) are positioned in the centers of the inlet and outlet of the curved section.

Thus, where the curve angle of the curved section 9d of the downstream exhaust passage 9b increases (where the curve angle exceeds 75 degrees in the case illustrated by FIGS. 7A to 7E), the increase in the wall surface temperature of the inner curved section becomes significant. Since the temperature of the passage wall surface forming the downstream exhaust passage 9b rises, the difference in temperature between the downstream exhaust passage 9b and the atmosphere (surrounding atmosphere) increases and, therefore, heat transfer from the downstream exhaust passage 9b to the atmosphere, that is, heat radiation Q14, becomes significant. At the same time, heat radiation Q12 from the exhaust gas flowing in the curved section 9d is enhanced, thereby causing the decrease in exhaust gas temperature.

Figure 8:
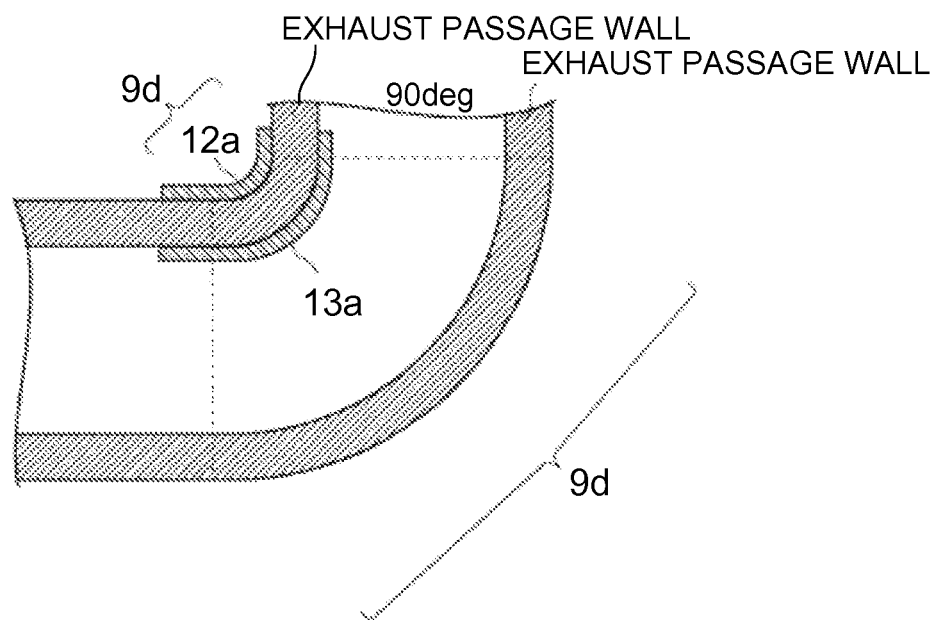
FIG. 8 is a first drawing illustrating the formation of a thermal insulation coat portion in the curved section of the exhaust passage.

With consideration for such a heat radiation trend in the curved section 9d of the downstream exhaust passage 9b, in other words, with consideration for the heat transfer correlation, the invention of the application uses the feature of arranging thermal insulation coat portions 12a, 13a at the inner curved section of the downstream exhaust passage 9b, as depicted in FIG. 8, in order to suppress the heat radiation Q12 and Q14 occurring through the curved section 9d. The thermal insulation coat portion 12a is a coat layer formed by coating a thermal insulation material (for example, alumina or glass) on the outer surface of the passage wall of the inner curved section, and the heat radiation Q14 is intended to be suppressed by the thermal insulation capacity of this coat portion. The thermal insulation coat portion 13a is a coat layer formed by coating a thermal insulation material (for example, alumina or glass) on the inner surface of the passage wall of the inner curved section, and the heat radiation Q12 is intended to be suppressed by the thermal insulation capacity of this coat portion. FIG. 8 is a cross-sectional view, and therefore the thermal insulation coat portions are depicted as stripes having a predetermined thickness, but they are actually formed as predetermined regions having a predetermined spread in the circumferential direction of the curved section 9d (the downstream exhaust passage 9b) and enclosing the inner curved section (the same is also true with respect to the thermal insulation coat portions 12b and 13b described hereinbelow).

The selection of the thermal insulation material for use in each thermal insulation coat portion will be described hereinbelow. According to the characteristic depicted in FIG. 3, where the material and shape of the thermal insulation gasket 11 are specified such that the overall heat transmittance is about 4, the wall surface temperature of the downstream exhaust passage 9b rises from about 170 degrees at the time when the overall heat transmittance is about 10 to about 300 degrees. In this case, the difference in temperature between the external air and the exhaust passage walls increases by 90% and the thermal conductivity from the exhaust gas to the external air through the exhaust passage rises by 17%. Further, when the thermal conductivity of the downstream exhaust passage 9b is taken as 16 (W/m/K) and the thickness thereof is taken as 5 mm, and the material of the thermal insulation coat portion 12a is coated to a thickness of 0.5 mm, the thermal conductivity of this material may be 0.78 (W/m/K) or less. In this case, a glass coat agent with a thermal conductivity within a range of about 0.2 (W/m/K) to 0.5 (W/m/K) can be used.

In order to suppress effectively the decrease in exhaust temperature, it is preferred that both the thermal insulation coat portion 12a and the thermal insulation coat portion 13a be formed at the inner curved section, but where the decrease in exhaust temperature can be sufficiently suppressed by suppressing only either one of the heat radiation Q12 and heat radiation Q14, only one of the thermal insulation coat portion 12a and the thermal insulation coat portion 13a may be formed at the inner curved section. The thermal insulation coat portions 12a, 13a depicted in FIG. 8 extend beyond the region of the curved section 9d to the exhaust passage walls of the straight-flow portions before and after the curved section, but this is not a problem since where the curved section 9d is included, it is possible to enjoy the effect of the heat radiation suppression. The thermal insulation coat portions 12a, 13a may be formed to coat only a part of the curved section 9d, rather than the entire curved section, provided that the effect of heat radiation suppression is sufficient.

Variation Example 1

Figure 9:
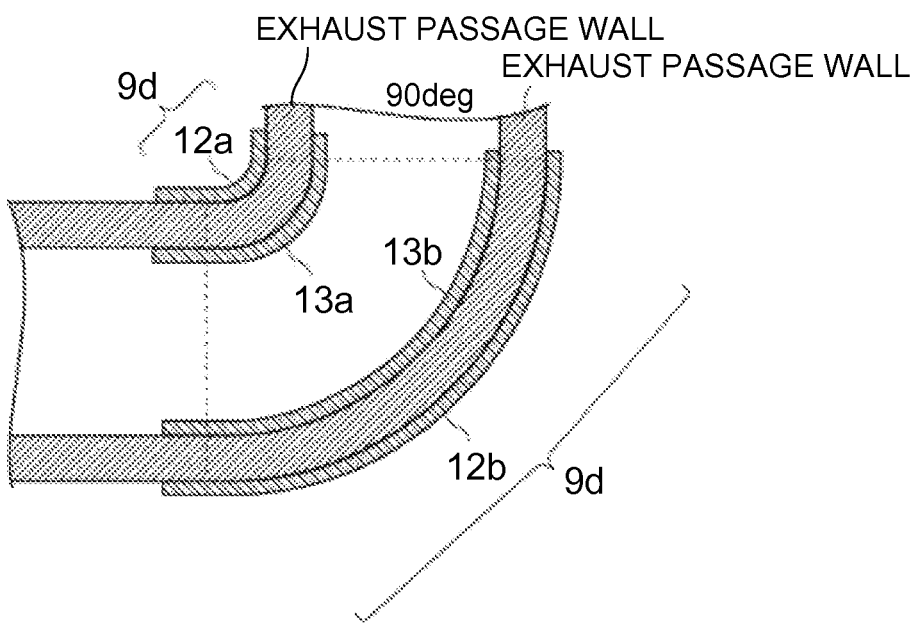
FIG. 9 is a second drawing illustrating the formation of a thermal insulation coat portion in the curved section of the exhaust passage.

As indicated hereinabove, in the curved section 9d of the downstream exhaust passage 9b, the thermal insulation coat portion 12a and the thermal insulation coat portion 13a are formed with consideration for the fact that the temperature of the inner curved section rises particularly easily, but where the entire curved section 9d is considered, the temperature of the outer curved section also tends to rise under the effect of the inner curved section. Accordingly, a thermal insulation coat portion 12b may be formed by coating a thermal insulation material (for example, alumina or glass) on the outer wall surface of the passage wall of the outer curved section and a thermal insulation coat portion 13b may be formed by coating a thermal insulation material (for example, alumina or glass) on the inner wall surface of the passage wall of the outer curved section, in addition to the thermal insulation coat portions 12a, 13a, as depicted in FIG. 9. As a result, heat radiation from the exhaust gas through the curved section 9d can be effectively suppressed.

Where the thermal insulation coat portions are thus provided on the outer curved section, in order to suppress effectively the decrease in exhaust temperature, it is also preferred that both the thermal insulation coat portion 12b and the thermal insulation coat portion 13b be formed on the outer curved section. However, where the decrease in exhaust temperature can be sufficiently suppressed by suppressing only either one of the heat radiation Q12 and heat radiation Q14, only either one of the thermal insulation coat portion 12b and the thermal insulation coat portion 13b may be formed at the outer curved section.

The region of the thermal insulation coat portion 12b may be connected to or separated from the thermal insulation coat portion 12a, provided that it is a predetermined region enclosing the outer wall surface of the outer curved section. Furthermore, the thermal insulation coat portions 12a and 12b may both define regions over the entire circumference of the outer wall surface of the curved section 9d (downstream exhaust passage 9b) or may define only a part of the circumference. Likewise, the region of the thermal insulation coat portion 13b may be connected to or separated from the thermal insulation coat portion 13a, provided that it is a predetermined region enclosing the inner wall surface of the outer curved section. Furthermore, the thermal insulation coat portions 13a and 13b may both define regions over the entire circumference of the inner wall surface of the curved section 9d (downstream exhaust passage 9b) or may define only a part of the circumference.

Variation Example 2

As mentioned hereinabove, since the temperature of the inner curved section rises easier than that of the outer curved section, heat radiation from the exhaust gas through the inner curved section is advanced to a greater degree. Accordingly, where the thermal insulation coat portions are formed on the inner curved section and outer curved section, as in the Variation Example 1, it is preferred that the thermal insulation coat portions be formed such that the thermal insulation capacity (that is, the ability to suppress heat radiation from the exhaust gas) of the thermal insulation coat portion formed on the inner curved section be higher than the thermal insulation capacity of the thermal insulation coat portion formed on the outer curved section. The setting of the thermal insulation capacity of the thermal insulation coat portions will be described hereinbelow by way of example with respect to an embodiment in which the thermal insulation coat portion 13a is formed on the inner wall surface of the inner curved section and the thermal insulation coat portion 13b is formed on the inner wall surface of the outer curved section, as depicted in FIG. 10.

More specifically, where the thermal insulation coat portions use the same thermal insulation material, the thickness of the coat layer of the thermal insulation coat portion 13a is set larger than the thickness of the thermal insulation coat portion 13b, so that the thermal insulation capacity of the thermal insulation coat portion 13a formed on the inner curved section be higher than the thermal insulation capacity of the thermal insulation coat portion 13b formed on the outer curved section. Further, the thickness of the coat layer of the thermal insulation coat portion 13a may be set larger than the thickness of the thermal insulation coat portion 13b over the entire coat region thereof, or may be set larger than the thickness of the thermal insulation coat portion 13b only in a part of the coat region thereof. In this case, it is preferred that the thickness of the thermal insulation coat portion 13a in the vicinity of a central point P1, where the temperature rises particularly easily among the regions of the inner wall surface of the inner curved section, be set larger than the thickness of the thermal insulation coat portion 13b in the vicinity of a central point P2, where the temperature rises particularly easily among the regions of the inner wall surface of the outer curved section, as depicted in FIG. 6B.

Figure 10:
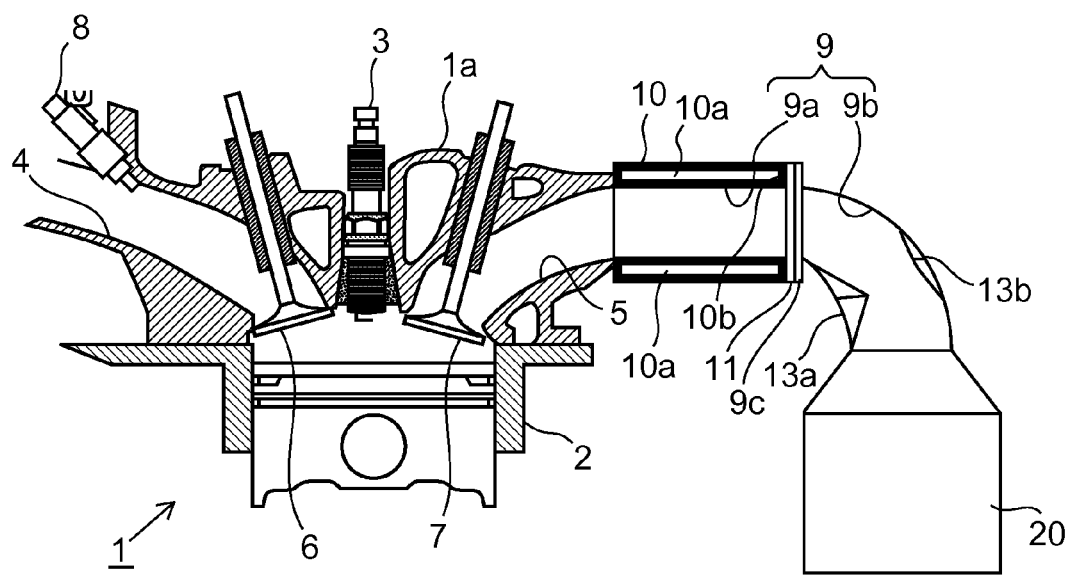
FIG. 10 is a second drawing illustrating the schematic configuration of the exhaust cooling system for an internal combustion engine in accordance with the invention.

FIG. 10 illustrates the thermal insulation coat portion 13a formed on the inner wall surface of the inner curved section and the thermal insulation coat portion 13b formed on the inner wall surface of the outer curved section, but the thickness of the coat layer of the thermal insulation coat portion 12a may be likewise set larger than the thickness of the thermal insulation coat portion 12b, such that the thermal insulation capacity of the thermal insulation coat portion 12a formed on the outer wall surface of the inner curved section be higher than the thermal insulation capacity of the thermal insulation coat portion 12b formed on the outer wall surface of the outer curved section. Further, instead of adjusting the thickness of the coat layers, the thermal insulation materials to be coated may be selected, as appropriate, in order to adjust the thermal insulation capacity of the thermal insulation coat portions.

Variation Example 3

As indicated hereinabove, the increase in temperature of the inner curved section becomes significant and heat radiation from the exhaust gas is enhanced as the curve angle of the curved section 9d increases. Accordingly, when realizing the suppression of heat radiation in the curved section 9d of the downstream exhaust passage 9b, the thickness of the coat layer of each thermal insulation coat section and the material to be coated thereon may be selected, as appropriate, such that the thermal insulation capacity of the thermal insulation coat portions 12a, 12b, 13a, 13b formed on the curved section 9d increase with the increase in the curve angle of the curved section 9d.

Further, likewise, the increase in temperature of the inner curved section becomes significant and heat radiation from the exhaust gas is enhanced as the thermal insulation ability of the thermal insulation gasket 11 increases, in other words, as the overall thermal transmittance of the thermal insulation gasket 11 decreases. Accordingly, in this case, the thickness of the coat layer of each thermal insulation coat section and the material to be coated thereon may be selected, as appropriate, such that the thermal insulation capacity of the thermal insulation coat portions 12a, 12b, 13a, 13b formed on the curved section 9d increases with the increase in the thermal insulation ability of the thermal insulation gasket 11.

Variation Example 4

In the above-described exemplary embodiments, heat radiation in the curved section 9d is suppressed by the thermal insulation coat portions. Alternatively, heat radiation suppression in the curved section 9d may be also realized by using a multiwall tubular structure (for example, a double-wall tubular structure) in the predetermined heat radiation suppression zone including the curved section 9d in the downstream exhaust passage 9b. For example, when the curved section 9d is formed as a double-wall tubular structure, the exhaust gas flows in the inner tube, and the outer tube is arranged such as to surround the inner tube. A predetermined space is formed between the inner tube and outer tube. In the inner tube in which the exhaust gas directly flows, although heat is transmitted from the exhaust gas and the temperature easily rises due to the presence of the curve angle, since the space between the inner tube and outer tube demonstrates a thermal insulation action, heat transfer from the inner tube to the outer tube is suppressed. As a result, heat transmission to the atmosphere around the outer tube is suppressed.

Figure 11:
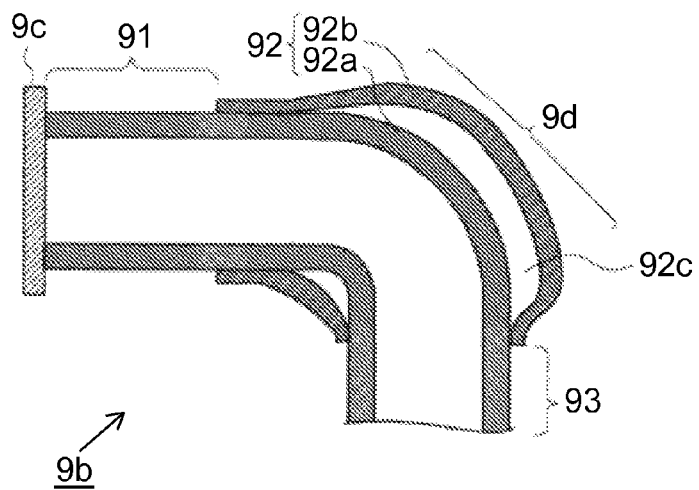
FIG. 11 is a first drawing illustrating the variation example of the downstream exhaust passage in the exhaust cooling system for an internal combustion engine in accordance with the invention.

For example, as depicted in FIG. 11, the downstream exhaust passage 9b is formed by a first exhaust passage 91, a second exhaust passage 92, and a third exhaust passage 93, in the order of description from the upstream side along the exhaust gas flow. The first exhaust passage 91 is connected to the connection flange 9c and formed by a single-wall tubular structure. Likewise, the third exhaust passage 93 is also formed by a single-wall tubular structure, and this passage 93 is connected to the exhaust purification catalyst 20. The second exhaust passage 92 formed between the first exhaust passage 91 and the third exhaust passage 93 is formed by a double-wall structure having an inner tube 92a and an outer tube 92b and also formed such as to include the curved section. Therefore, a hollow layer 92c positioned between the inner tube 92a and the outer tube 92b is formed in the curved section 9d, and this hollow layer 92c suppresses heat transfer from the inner tube 92a to the outer tube 92b, thereby suppressing heat radiation to the atmosphere around the outer tube 92b. The double-wall tubular structure of the second exhaust passage 92 is formed by welding the outer tube 92b to the inner tube 92a.

Further, concerning the predetermined heat radiation suppression zone formed as the double-wall tubular structure, it may formed, for example, only as a region of the curved section 9d depicted in FIG. 8, or as a double-wall tubular structure that extends beyond the region of the curved section 9d to the exhaust passage wall in the straight-flow portions before and after the curved section. In either case, it is considered that the effect of heat radiation suppression can be enjoyed since the location with a double-wall structure in the downstream exhaust passage 9b includes the curved section 9d, and other locations (exhaust passage formed by exhaust passage walls with straight-flow portions) have a single-wall tubular structure. The location with a double-wall structure does not necessarily include the entire curved section 9d and may be limited to part thereof, provided that a sufficient heat radiation suppression effect is obtained.

Further, instead of the configuration depicted in FIG. 11, it is possible to configure the second exhaust passage 92 as a triple-wall tubular structure, which includes a large number of tubes, in order to increase the heat radiation suppression effect in the curved section 9d when the first exhaust passage 91 and the third exhaust passage 93 are formed by double-wall structures. Thus, the above-described heat radiation suppression effect in the curved section 9d can be ensured by increasing the number of tubes in the second exhaust passage 92 over that in the first exhaust passage 91 and third exhaust passage 93.

Figure 12:
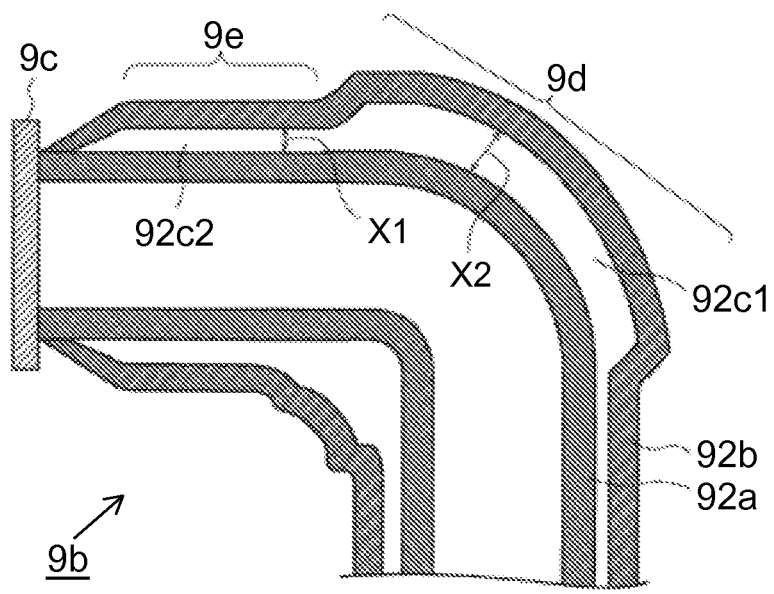
FIG. 12 is a second drawing illustrating the variation example of the downstream exhaust passage in the exhaust cooling system for an internal combustion engine in accordance with the invention.

Furthermore, as a configuration alternative to the downstream exhaust passage 9b demonstrating the heat radiation suppression effect, as depicted in FIG. 12, the downstream exhaust passage 9b is formed by a double-wall tubular structure having the inner tube 92a and the outer tube 92b, and the downstream exhaust passage 9b is formed such that a thickness X2 of the layer of a hollow portion 92c1 in the predetermined heat radiation suppression zone including the curved section 9d is larger than a thickness X1 of the layer of a hollow section 92c2 in an exhaust passage 9e upstream of the predetermined heat radiation suppression zone. With such a configuration, the heat radiation suppression in the predetermined heat radiation suppression zone, which has a thicker layer of the hollow portion can be effectively realized in the downstream exhaust passage 9b.

Figure 13:
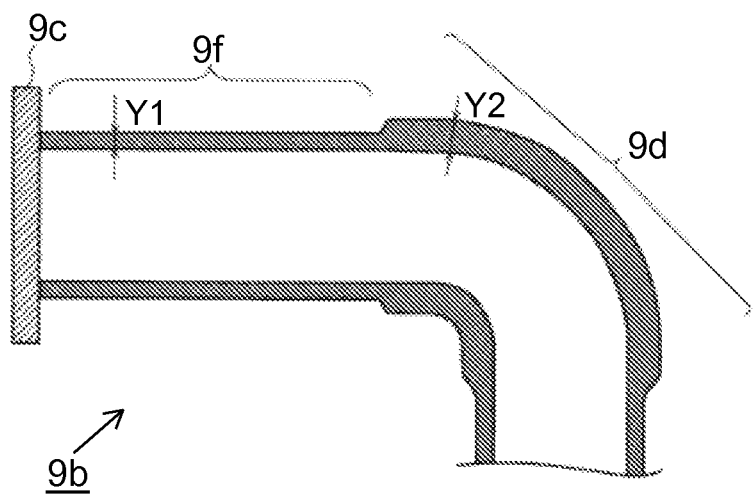
FIG. 13 is a third drawing illustrating the variation example of the downstream exhaust passage in the exhaust cooling system for an internal combustion engine in accordance with the invention.

As another configuration alternative to the downstream exhaust passage 9b demonstrating the heat radiation suppression effect, as depicted in FIG. 13, when the downstream exhaust passage 9b is formed by a single-wall tubular structure, the downstream exhaust passage 9b is formed such that a thickness Y2 of the exhaust passage wall in the predetermined heat radiation suppression zone including the curved section 9d is larger than a thickness Y1 of the passage wall of an exhaust passage 9f upstream of the predetermined heat radiation suppression zone. Such an increase in thickness of the exhaust passage wall in the predetermined heat radiation suppression zone increases heat capacity thereof, thereby making it possible to attenuate the increase in temperature of the predetermined heat radiation suppression zone and thus suppress the heat radiation therein.

Variation Example 5

Figure 14:
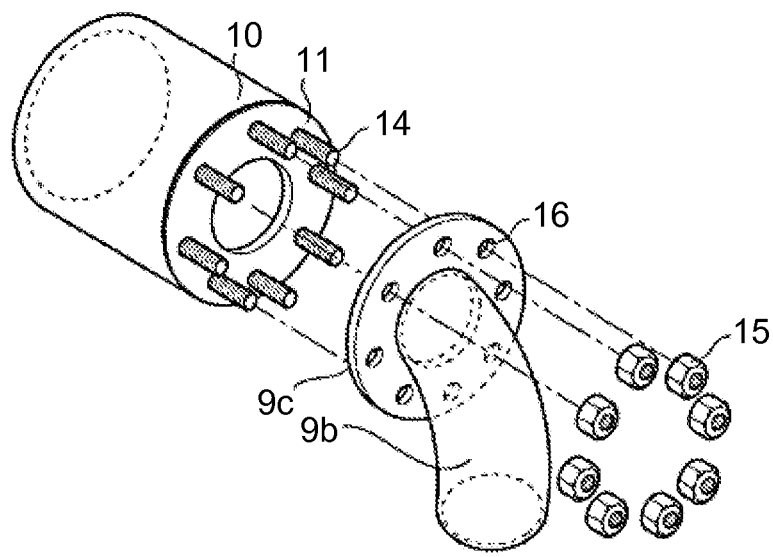
FIG. 14 illustrates the connection configuration of the downstream exhaust passage and cooling adapter in the exhaust cooling system for an internal combustion engine in accordance with the invention.

In the above-described exemplary embodiments, the thermal insulation gasket 11 is used as the heat transmission inhibition portion, but the following configuration can be also used as another embodiment. Initially, the end surface 10b of the cooling adapter 10, which is to be connected to the connection flange 9c of the downstream exhaust passage 9b may be formed such as to obtain thermal insulation ability similar to that of the thermal insulation gasket 11. More specifically, the overall heat transmittance with respect to the heat inflow from the downstream exhaust passage 9b is reduced by forming the end surface 10b from a predetermined thermal insulation member or reducing the contact surface area with the connection flange 9c. Likewise, the connection flange 9c which is to be connected to the cooling adapter 10 may be formed such as to obtain thermal insulation ability similar to that of the thermal insulation gasket 11. Further, as depicted in FIG. 14, the cooling adapter 10 and the connection flange 9c are connected together by inserting stud bolts 14, which project from the cooling adapter 10 side into through holes 16 provided in the connection flange 9c, and fixing with nuts 15. The stud bolts 14 and nuts 15, which are fastening members for connecting together the cooling adapter 10 and the connection flange 9c, also may be formed such as to obtain thermal insulation ability similar to that of the thermal insulation gasket 11. In particular, since the stud bolts 14 pass through inside the cooling adapter 10 and the connection flange 9c, they easily transmit heat. Therefore, heat transfer from the downstream exhaust passage 9b to the cooling adapter 10 can be effectively inhibited by increasing thermal insulation ability of the stud bolts 14 and also nuts 15 and washers (not depicted in the figure) related thereto.

Figure 15:
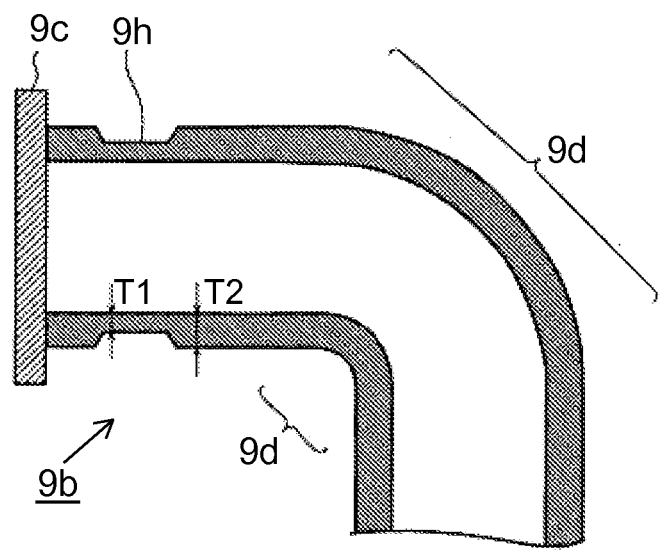
FIG. 15 is a fourth drawing illustrating the variation example of the downstream exhaust passage in the exhaust cooling system for an internal combustion engine in accordance with the invention.
Figure 16:
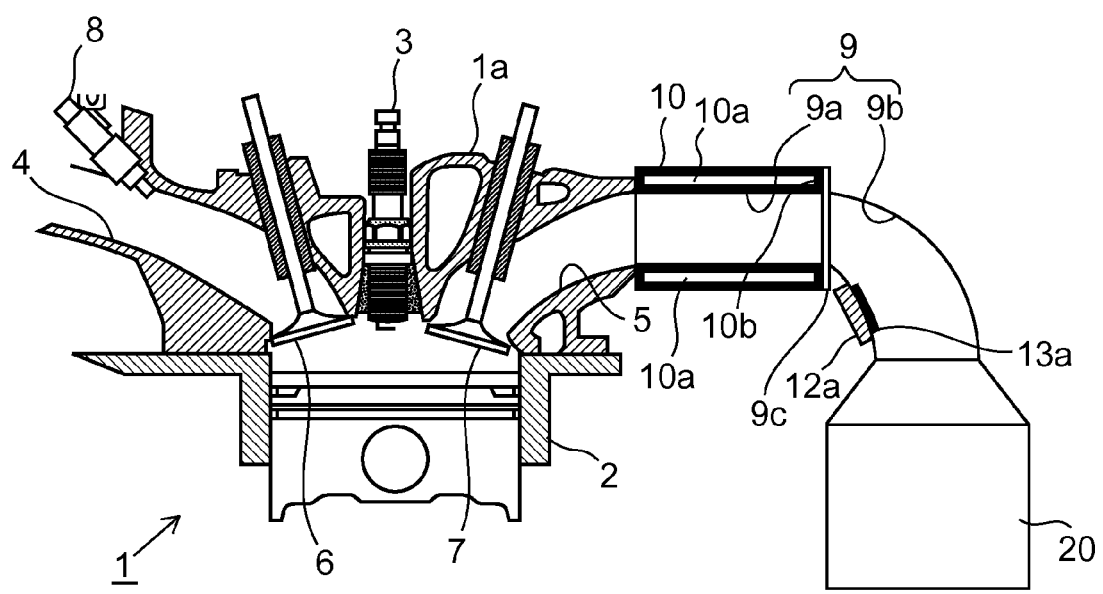
FIG. 16 is a third drawing illustrating the schematic configuration of the exhaust cooling system for an internal combustion engine in accordance with the invention.

Further, heat transfer from the downstream exhaust passage 9b to the cooling adapter 10 may be also inhibited by increasing thermal insulation ability of a predetermined region of the exhaust passage wall between the connection flange 9c and the curved section 9d in the downstream exhaust passage 9b. More specifically, where the thickness T1 of the exhaust passage wall corresponding to a predetermined region 9h of the exhaust passage upstream of the curved section 9d is made less than the thickness T2 of the exhaust passage wall of the curved section 9d and the cross-sectional area of the exhaust passage wall of the predetermined region 9h is made less than the thermal insulation area of the passage wall of the curved section 9d, as depicted in FIG. 15, the overall heat transmittance of the predetermined region 9h may be set to a value suitable for the heat transmission inhibition portion. The predetermined region 9h may be set, as appropriate, in the downstream exhaust passage 9b with consideration for the configuration of the actual internal combustion engine 1 and the size and shape of the downstream exhaust passage 9b.

The technical idea illustrated by FIG. 15 is that the transfer of heat to the connection flange 9c side is inhibited by making the thickness of the passage wall in the predetermined region 9h less than the thickness of the passage wall of the curved section 9d. Meanwhile, the above-described technical idea illustrated by FIG. 13 is that heat radiation in the curved section 9d is suppressed by increasing the thickness of the passage wall of the curved section 9d over that of the passage wall of the exhaust passage positioned upstream of the curved section 9d. Therefore, it is worth noting that FIG. 15 and FIG. 13 illustrate different technical ideas.

The specific form of the heat transmission inhibition portion described herein is not necessary always limited to a single form, and a plurality of forms can be used at the same time.

Variation Example 6

In the above-described exemplary embodiment, the cooling unit (cooling adapter) 10 is mounted on the outer part of the cylinder head 1a, but a form can be used instead in which the cooling unit is incorporated in the cylinder head 1a. In this case, cooling of the exhaust gas flowing inside the exhaust port 5, which is the exhaust passage, is performed with the incorporated cooling unit. Further, a thermal insulation gasket is arranged between the discharge port and the discharge passage outside the cylinder head 1a which is to be connected to the exhaust port, and the above-described thermal insulation coat portion is formed in the curved section of the exhaust passage. In such a configuration, the exhaust port 5 corresponds to the exhaust passage inside a head in the invention of the application. As a result, the decrease in exhaust gas temperature can be effectively suppressed. Further, in some cases, an exhaust manifold connected to the cylinders of the internal combustion engine 1 is formed inside the cylinder head 1a. In such cases, the exhaust gas is also cooled by the cooling unit incorporated in the cylinder head 1a, and the exhaust manifold corresponds to the exhaust passage inside a head. With such a configuration, the decrease in exhaust gas temperature can be also effectively suppressed by arranging a thermal insulation gasket and forming thermal insulation coat portions in the same manner as described hereinabove.

Heat radiation in the curved section 9d can be also suppressed by using the above-described multiwall tubular structure when the cooling unit is thus configured to cool the exhaust passage inside a head. Further, instead of using the thermal insulation gasket, it is also possible, by following the technical idea same as that of Variation Example 5 hereinabove, to form at least any one of the end surface on the cylinder head 1a side which is to be connected to the exhaust passage, the connection flange on the exhaust passage 9 side which is to be connected to the cylinder head 1a, the fastening members for connecting the cylinder head 1a and the connection flange, and the predetermined region of the exhaust passage wall between the connection flange and the curved section 9d such as to obtain thermal insulation ability similar to that of the thermal insulation gasket 11.

Exemplary Embodiment 2

As described in detail in Exemplary Embodiment 1 and variation examples, it is useful to form a thermal insulation coat portion, in particular, on the inner curved section of the curved section 9d as means for suppressing heat transmission from the exhaust gas through the curved section 9d of the downstream exhaust passage 9b when the internal combustion engine 1 operates in a low-load mode. In Exemplary Embodiment 1, the attention is paid to the fact that the heat radiation through the curved section 9d is enhanced by providing the thermal insulation gasket 11 between the upstream exhaust passage 9a, which is directly cooled by the cooling adapter 10, and the downstream exhaust passage 9b. However, in the exemplary embodiment, the attention is focused on the heat radiation through the curved section 9d itself, and the cooling system of the internal combustion engine 1 depicted in FIG. 11 is presented by way of example as the configuration that directly suppresses the heat radiation.

In the cooling system of the internal combustion engine 1 depicted in FIG. 11 and the cooling system depicted in FIG. 1, like components are assigned with like reference numerals and detailed explanation thereof is herein omitted. The difference therebetween is that in the cooling system of the internal combustion engine 1 depicted in FIG. 11, the upstream exhaust passage 9a and the downstream exhaust passage 9b are connected without using the thermal insulation gasket 11. With such a configuration, heat radiation from the exhaust gas flowing in the curved section 9d to the atmosphere through the exhaust passage wall of the curved section 9d can be also suppressed and the decrease in exhaust gas temperature can thus be suppressed by providing the thermal insulation coat portions 12a, 13a at least in the inner curved section of the curved section 9d.

The technical ideas described in Exemplary Embodiment 1 and variation examples can be also used in the exemplary embodiment, provided that no technical conflict is caused thereby.

1 internal combustion engine
2 cylinder
3 sparkplug
4 intake port
5 exhaust port
8 fuel injection valve
9 exhaust passage
9a upstream exhaust passage
9b downstream exhaust passage
9d curved section
10 cooling adapter
11 thermal insulation gasket
12a, 12b, 13a, 13b thermal insulation coat portions
20 exhaust purification catalyst

What is claimed is:

1. An exhaust cooling system for an internal combustion engine, the exhaust cooling system comprising:
an exhaust purification catalyst arranged in an exhaust passage of the internal combustion engine;
a cooling unit configured to cool the exhaust passage upstream of the exhaust purification catalyst;
a heat transmission inhibition portion configured such that heat transfer between the exhaust passage downstream of a location cooled by the cooling unit and the cooling unit is inhibited;
a curved section positioned in the exhaust passage from a location where the heat transmission inhibition portion is provided to the exhaust purification catalyst; and
a heat radiation suppression portion provided in the curved section, the heat radiation suppression portion being configured to suppress heat radiation transmitted from exhaust gas flowing in the curved section to an atmosphere around the curved section through curved section passage walls forming the curved section, wherein
the curved section includes an inner curved section with a curvature radius and an outer curved section with a curvature radius, that is larger than the curvature radius of the inner curved section, in a cross section including a central axis in a longitudinal direction of the exhaust passage;
the heat radiation suppression portion is provided at the inner curved section and the outer curved section;
the heat radiation suppression portion is configured such that a heat radiation suppression capacity of the heat radiation suppression portion in the inner curved section is higher than a heat radiation suppression capacity of the heat radiation suppression portion in the outer curved section, and
a coat layer is applied on the inner curved section and the outer curved section such that the heat radiation suppression capacity of the inner curved section is higher than that of the outer curved section.

2. An exhaust cooling system for an internal combustion engine, the exhaust cooling system comprising:
an exhaust purification catalyst arranged in an exhaust passage of the internal combustion engine;
a cooling unit configured to cool the exhaust passage upstream of the exhaust purification catalyst;
a heat transmission inhibition portion configured such that heat transfer between the exhaust passage downstream of a location cooled by the cooling unit and the cooling unit is inhibited;
a curved section positioned in the exhaust passage from a location where the heat transmission inhibition portion is provided to the exhaust purification catalyst; and
a heat radiation suppression portion provided in the curved section, the heat radiation suppression portion being configured to suppress heat radiation transmitted from exhaust gas flowing in the curved section to an atmosphere around the curved section through curved section passage walls forming the curved section, wherein
the heat radiation suppression portion is configured as a hollow multiwall tubular structure in which an inner tube and an outer tube are arranged apart from each other in a predetermined heat radiation suppression region including the curved section in the exhaust passage; and
the exhaust passage upstream of the predetermined heat radiation suppression region is configured as a single-wall tubular structure or a multiwall tubular structure with a number of tubes less than that in the predetermined heat radiation suppression region.

3. A method for manufacturing an exhaust cooling system including an exhaust purification catalyst arranged in an exhaust passage of the internal combustion engine; a cooling unit configured to cool the exhaust passage upstream of the exhaust purification catalyst; a heat transmission inhibition portion configured such that heat transfer between the exhaust passage downstream of a location cooled by the cooling unit and the cooling unit is inhibited; a curved section positioned in the exhaust passage from a location where the heat transmission inhibition portion is provided to the exhaust purification catalyst; and a heat radiation suppression portion provided in the curved section, the heat radiation suppression portion being configured to suppress heat radiation transmitted from exhaust gas flowing in the curved section to an atmosphere around the curved section through curved section passage walls forming the curved section, the method including the step of:

setting a larger heat radiation suppression capacity of the heat radiation suppression portion as a heat transfer inhibition capacity exhibited by the heat transmission inhibition portion or a curve angle of the curved section becomes larger.

4. An exhaust cooling system for an internal combustion engine, the exhaust cooling system comprising:

an exhaust purification catalyst arranged in an exhaust passage of the internal combustion engine;

a cooling unit configured to cool the exhaust passage upstream of the exhaust purification catalyst;

a curved section positioned in the exhaust passage from a location cooled by the cooling unit to the exhaust purification catalyst, the curved section including an inner curved section with a curvature radius and an outer curved section with a curvature radius, that is larger than the curvature radius of the inner curved section, in a cross section including a central axis in a longitudinal direction of the exhaust passage; and a heat radiation suppression portion provided at at least the inner curved section in the curved section, the heat radiation suppression portion being configured to suppress heat radiation transmitted from exhaust gas flowing in the curved section to an atmosphere around the curved section through curved section passage walls forming the curved section, wherein the heat radiation suppression portion is provided at the inner curved section and the outer curved section;

a heat radiation suppression capacity of the heat radiation suppression portion in the inner curved section is higher than a heat radiation suppression capacity of the heat radiation suppression portion in the outer curved section; and wherein a coat layer is applied on the inner curved section and the outer curved section such that the heat radiation suppression capacity of the inner curved section is higher than that of the outer curved section.

5. An exhaust cooling system for an internal combustion engine, the exhaust cooling system comprising:

an exhaust purification catalyst arranged in an exhaust passage of the internal combustion engine;

a cooling unit configured to cool the exhaust passage upstream of the exhaust purification catalyst;

a curved section positioned in the exhaust passage from a location cooled by the cooling unit to the exhaust purification catalyst, the curved section including an inner curved section with a curvature radius and an outer curved section with a curvature radius, that is larger than the curvature radius of the inner curved section, in a cross section including a central axis in a longitudinal direction of the exhaust passage; and a heat radiation suppression portion provided at at least the inner curved section in the curved section, the heat radiation suppression portion being configured to suppress heat radiation transmitted from exhaust gas flowing in the curved section to an atmosphere around the curved section through curved section passage walls forming the curved section, wherein the heat radiation suppression portion is configured as a hollow multiwall tubular structure in which an inner tube and an outer tube are arranged apart from each other in a predetermined heat radiation suppression region including the curved section in the exhaust passage; and the exhaust passage upstream of the predetermined heat radiation suppression region is configured as a single-wall tubular structure or a multiwall tubular structure with the number of tubes less than that in the predetermined heat radiation suppression region.

* * * * *